(12) United States Patent
Palinkas et al.

(10) Patent No.: US 8,056,593 B2
(45) Date of Patent: Nov. 15, 2011

(54) NON-PNEUMATIC TIRE

(75) Inventors: Richard Palinkas, Northfield, CT (US);
Ian Laskowitz, Woodbury, CT (US);
George Nybakken, Middlebury, CT (US)

(73) Assignee: Chemtura Corporation, Middlebury, CT (US)

( * ) Notice: Subject to any disclaimer, the term of this patent is extended or adjusted under 35 U.S.C. 154(b) by 71 days.

(21) Appl. No.: 12/036,939

(22) Filed: Feb. 25, 2008

(65) Prior Publication Data

US 2009/0107596 A1 Apr. 30, 2009

Related U.S. Application Data

(63) Continuation-in-part of application No. 29/296,763, filed on Oct. 26, 2007, now Pat. No. Des. 602,852, and a continuation-in-part of application No. 29/298,667, filed on Dec. 10, 2007, now Pat. No. Des. 602,422.

(51) Int. Cl.
*B60C 7/00* (2006.01)

(52) U.S. Cl. .................. 152/324; 152/5; 152/323

(58) Field of Classification Search .......... 152/1, 5, 152/7, 323, 324, 325, 327, 328
See application file for complete search history.

(56) References Cited

U.S. PATENT DOCUMENTS

| | | | |
|---|---|---|---|
| 763,909 A * | 6/1904 | Krotz | 152/324 |
| 767,041 A | 8/1904 | Curfman | |
| 1,067,744 A | 7/1913 | Lane | |
| 1,103,813 A | 7/1914 | Murray | |
| 1,258,461 A | 3/1918 | Reid | |
| 1,261,120 A | 4/1918 | Gries | |
| 1,299,205 A | 1/1919 | Morgan | |
| 1,334,493 A | 3/1920 | Holahan | |
| 1,340,244 A | 5/1920 | Osborne | |
| 1,360,119 A * | 11/1920 | Krotz | 152/324 |
| 1,414,252 A * | 4/1922 | Brubaker | 152/324 |
| 1,470,922 A * | 10/1923 | Hulse | 152/324 |
| 1,641,150 A | 9/1927 | Brubaker | |
| 2,233,562 A | 3/1941 | Tannewitz | |
| D201,238 S | 5/1965 | Fishman | |
| 3,219,090 A | 11/1965 | Cislo | |
| 3,248,372 A | 4/1966 | Bunge | |
| 3,384,624 A | 5/1968 | Heiss | |
| 4,061,662 A | 12/1977 | Marans et al. | |

(Continued)

FOREIGN PATENT DOCUMENTS

EP 28350 A1 * 5/1981

(Continued)

OTHER PUBLICATIONS

Machine Translation of EP0028350A1.*

(Continued)

*Primary Examiner* — Kip T Kotter
(74) *Attorney, Agent, or Firm* — Joseph Suhadolnik

(57) ABSTRACT

A non-pneumatic tire comprising side cavities that are staggered with respect to laterally opposing side cavities, and laterally extending tread grooves that are in substantial radial alignment with the cavities. In another embodiment, the invention is to a tire comprising side ribs that are staggered with respect to laterally opposing side ribs, and laterally extending tread grooves that are substantially offset relative to the side ribs. Also provided are processes for making such tires and to off-the-road (OTR) vehicles employing such tires.

21 Claims, 12 Drawing Sheets

U.S. PATENT DOCUMENTS

| | | | |
|---|---|---|---|
| 4,101,473 A | 7/1978 | Lander | |
| 4,164,251 A | 8/1979 | Chung | |
| 4,182,825 A | 1/1980 | Jakle | |
| 4,226,273 A | 10/1980 | Long et al. | |
| 4,288,577 A | 9/1981 | McShane, Jr. | |
| 4,385,171 A | 5/1983 | Schnabel et al. | |
| 4,624,996 A | 11/1986 | Rizk et al. | |
| 4,784,201 A | 11/1988 | Palinkas et al. | |
| 4,832,098 A | 5/1989 | Palinkas et al. | |
| 4,888,442 A | 12/1989 | Dunlap et al. | |
| 4,921,029 A | 5/1990 | Palinkas et al. | |
| 4,934,425 A | 6/1990 | Gajewski et al. | |
| 4,945,962 A | 8/1990 | Pajtas | |
| 5,023,040 A | 6/1991 | Gajewski et al. | |
| 5,077,371 A | 12/1991 | Singh et al. | |
| 5,139,066 A | 8/1992 | Jarman | |
| D329,413 S | 9/1992 | Chandler | |
| 5,223,599 A | 6/1993 | Gajewski | |
| 5,265,659 A | 11/1993 | Pajtas et al. | |
| 5,343,916 A | 9/1994 | Duddey et al. | |
| 5,390,985 A | 2/1995 | Chandler | |
| 5,460,213 A | 10/1995 | Pajtas | |
| 5,605,657 A | 2/1997 | Nybakken et al. | |
| 5,676,900 A | 10/1997 | Pajtas | |
| 5,703,193 A | 12/1997 | Rosenberg et al. | |
| D401,896 S | 12/1998 | Chandler et al. | |
| D410,603 S | 6/1999 | Chandler et al. | |
| 6,170,544 B1 | 1/2001 | Hottebart | |
| D455,996 S | 4/2002 | Buckley | |
| 6,681,822 B2 | 1/2004 | Adams et al. | |
| 6,723,771 B2 | 4/2004 | Palinkas et al. | |
| 6,802,922 B1 | 10/2004 | Ueda et al. | |
| D498,203 S | 11/2004 | Shapiro et al. | |
| D499,065 S | 11/2004 | Shapiro et al. | |
| 6,845,796 B2 * | 1/2005 | Katoh et al. | 152/209.1 |
| 6,868,880 B2 | 3/2005 | Cummins | |
| 7,013,939 B2 | 3/2006 | Rhyne et al. | |
| D536,298 S | 2/2007 | Becker et al. | |
| 7,174,934 B2 | 2/2007 | Hill, III et al. | |
| 7,174,936 B2 | 2/2007 | Becker et al. | |
| 7,201,194 B2 | 4/2007 | Rhyne et al. | |
| D548,681 S | 8/2007 | Becker et al. | |
| 2002/0092589 A1 | 7/2002 | Katoh et al. | |
| 2003/0065124 A1 | 4/2003 | Rosenberg et al. | |
| 2006/0137795 A1 * | 6/2006 | Hill | 152/209.23 |
| 2007/0089820 A1 | 4/2007 | Gabrys et al. | |
| 2007/0119531 A1 | 5/2007 | Steinke et al. | |
| 2007/0213497 A1 | 9/2007 | Nagaraj et al. | |
| 2007/0215259 A1 | 9/2007 | Burns | |
| 2007/0267116 A1 | 11/2007 | Rhyne et al. | |
| 2009/0211678 A1 | 8/2009 | Palinkas et al. | |
| 2010/0147427 A1 | 6/2010 | Ishiyama | |

FOREIGN PATENT DOCUMENTS

| | | |
|---|---|---|
| EP | 159888 | 10/1985 |
| EP | 245789 | 11/1987 |
| EP | 297628 | 1/1989 |
| EP | 334522 | 9/1989 |
| EP | 353006 | 1/1990 |
| EP | 399383 | 11/1990 |
| EP | 502353 | 9/1992 |
| EP | 1 420 964 | 5/2004 |
| GB | 14087 A | 0/1912 |
| GB | 120589 A | 11/1918 |
| GB | 228495 A | 11/1925 |
| GB | 1101410 A | 1/1968 |
| GB | 2431383 | 4/2007 |
| JP | 06-016767 A | 7/1991 |
| JP | 08-176252 A | 7/1996 |
| UA | 23940 A1 | 5/1993 |
| WO | 8905736 | 6/1989 |
| WO | 91/17899 | 11/1991 |
| WO | 9514582 | 6/1995 |
| WO | 9718959 | 5/1997 |
| WO | 9843833 | 10/1998 |
| WO | 03018332 | 3/2003 |
| WO | 2008009042 | 1/2008 |

OTHER PUBLICATIONS

International Preliminary Examination Report for PCT/US00/30062 (5 pages) Dated Apr. 3, 2002.

Klingner, T., Controlling Dermal Exposure to Isocyanates: Maintaining the PMA's Leadership in Health and Safety a Paper presented at the Polyurethane Manufacturer Association Meeting, Baltimore, MD, Oct. 1998.

Lamba, N. et al., Polyurethanes in Biomedical Applications, CRC Press LLC (1998).

Wester, R., et al., Toxicol. Sci. 48(1): 1-4 (1999).

International Search Report for international Application PCT/US2008/081111.

International Search Report for International Application PCT/US2009/033986.

Chemtura Corp., Technical Information, "Adiprene LFM 2450," (Nov. 26, 2007).

Nybakken, "Premium blocked PU System for Pouring Very large Parts," Polyurethane manufactures Association (May 6, 2008).

Nybakken, "Performance Advantages of LFM Prepolymers Cured with Blocked Methylene Diamine," Polyurethane Manufactures Association (Apr. 16, 2007).

United States Patent and Trademark Office, Office Action mailed Oct. 26, 2010 for U.S. Appl. No. 12/257,740.

International Search Report and Written Opinion for PCT/US2008/081111 mailed Jan. 28, 2009.

International Preliminary Report on Patentability for PCT/US2008/081111 mailed Feb. 2, 2010.

\* cited by examiner

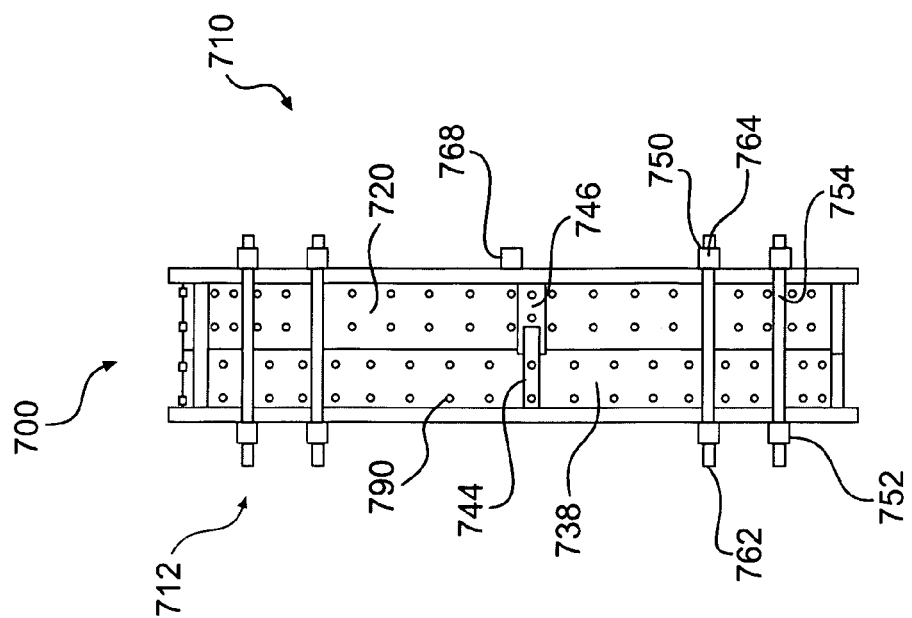
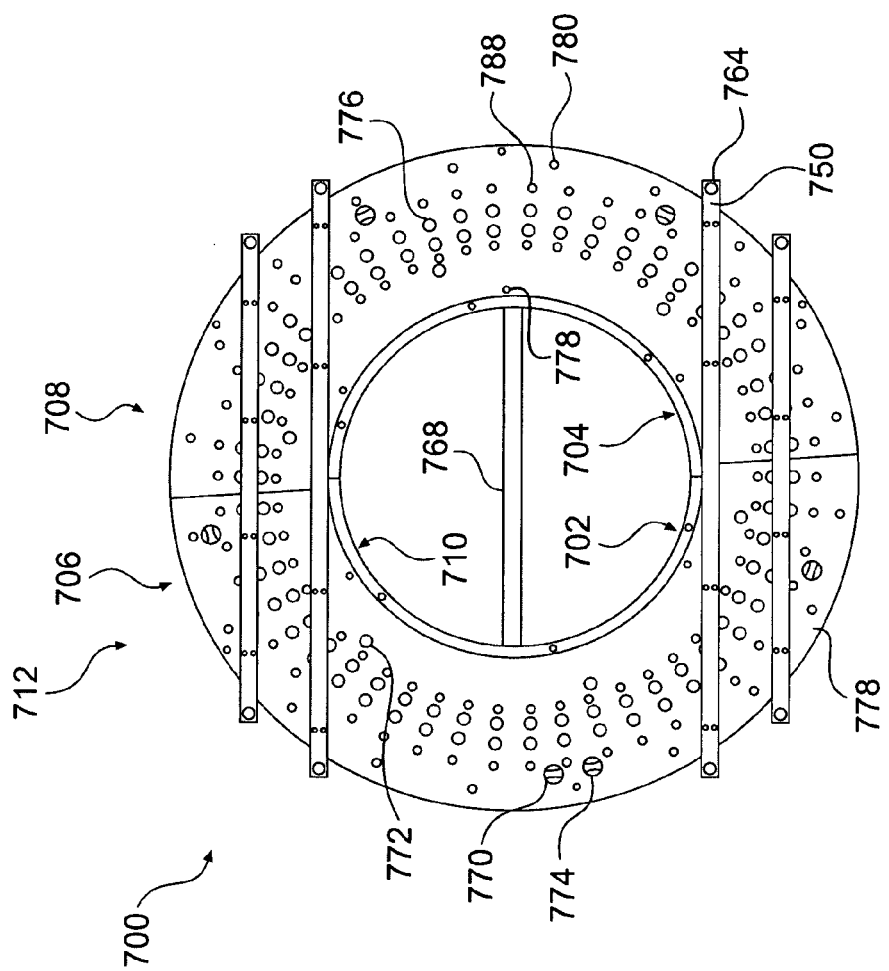
FIG. 7D
FIG. 7C

NON-PNEUMATIC TIRE

CROSS-REFERENCE TO RELATED APPLICATIONS

This application claims priority to co-pending U.S. Design Application No. 29/296,763, filed Oct. 26, 2007, and U.S. Design Application No. 29/298,667, filed Dec. 10, 2007, the entireties of which are incorporated herein by reference.

BACKGROUND OF THE INVENTION

1. Field of the Invention

This invention relates to tires and more particularly to non-pneumatic tires suitable for off-the-road vehicles.

2. Discussion of the Background Information

Off-the-road (OTR) vehicles, also known as off-highway vehicles, are commonly used in rugged terrain for mining, excavation, construction, military applications, and other heavy industrial applications. OTR vehicles include tractors, trucks, loaders, dozers, graters, excavators, etc., and may have operational weights as high as 380 to 460 tons. Typically such OTR vehicles have several inflatable tires made of rubber. These applications require that each tire have properties such as being puncture-proof, able to carry relatively heavy loads, and good resistance to wear and tear. Conventional inflatable tires generally have short operational life spans of about six months. Further, the typical rugged operating environment for OTR vehicles exposes the tires to possible failures, such as punctures, blowouts, tears, and separation of the tire from the rim. Thus, the time and cost to maintain such OTR vehicles increases because the inflatable tires need to be replaced due to normal wear and tire failure. For mining vehicles, for example, shortages of suitable replacement tires may cause a mine operator to shut down production while waiting for new replacement tires. This may cause particular hardships for remotely located mines that receive sporadic or irregular shipments of new supplies.

While improvements in the durability of such inflatable tires continue to be made, such tires are still exposed to normal wear and failure. Thus, the need exists for tires suitable for OTR vehicles that overcome the shortcomings of conventional inflatable tires.

SUMMARY OF THE INVENTION

In a first aspect of the present invention, there is provided a non-pneumatic tire, comprising side cavities that are staggered with respect to laterally opposing side cavities, and laterally extending tread grooves that are in substantial radial alignment with the cavities. In such aspects the cavities may be separated by a rib. In one embodiment, there is provided a central web.

In a second aspect of the present invention, there is provided a non-pneumatic tire, comprising side ribs that are staggered with respect to laterally opposing side ribs, and laterally extending tread grooves that are substantially radially offset relative to the side ribs. In one embodiment, there is provided a central web.

In a third aspect of the present invention, there is provided a non-pneumatic tire, comprising: inner and outer circumferential members; a central web connecting the circumferential members; ribs extending from opposing sidewalls to the central web and defining side cavities, wherein ribs on one side of the central web are staggered relative to ribs on an opposite side of the central web; and laterally extending tread grooves embedded in an outer surface of the outer circumferential member and extending inwardly from respective sides of the tire, wherein the tread grooves are substantially offset relative to the ribs.

In a fourth aspect of the present invention, there is provided a non-pneumatic tire, comprising side cavities that are staggered with respect to laterally opposing side cavities, and laterally extending tread grooves that are substantially offset relative to the cavities. In such aspects the cavities may be separated by a rib. In one embodiment, there is provided a central web.

In a fifth aspect of the present invention, there is provided a non-pneumatic tire, comprising side ribs that are staggered with respect to laterally opposing side ribs, and laterally extending tread grooves that are in substantial radial alignment with the side ribs. In one embodiment, there is provided a central web.

In a sixth aspect of the present invention, there is provided a non-pneumatic tire, comprising: inner and outer circumferential members; a central web connecting the circumferential members; ribs extending from opposing sidewalls to the central web and defining side cavities, wherein ribs on one side of the central web are staggered relative to ribs on an opposite side of the central web; and laterally extending tread grooves embedded in an outer surface of the outer circumferential member and extending inwardly from respective sides of the tire, wherein the tread grooves are in substantial radial alignment with the ribs.

In some embodiments, the ribs and/or cavities are radially oriented. In other embodiments, the ribs and/or cavities are angled relative to the radial direction.

In some embodiments of the present invention, an off-the-road vehicle comprises a non-pneumatic tire according to the aspects and embodiments of the present invention.

In a seventh aspect of the present invention, there is provided a process for making a non-pneumatic tire, comprising blending a polyurethane prepolymer mixture and a curative at a temperature of about 45±20° C., and curing the blend in a mold by heating the mold to a temperature of about 125±25° C. In one embodiment, the mold comprises inverse cavities to make the tire. The tire comprises side cavities that are staggered with respect to laterally opposing side cavities and laterally extending tread grooves that are in substantial radial alignment with the side cavities.

In a eighth aspect of the present invention, there is provided a process for making a non-pneumatic tire, comprising blending a polyurethane prepolymer mixture and a curative at a temperature of about 45±20° C., and curing the blend in a mold by heating the mold to a temperature of about 125±25° C. In one embodiment, the mold comprises inverse cavities to make the tire. The tire comprising side cavities that are staggered with respect to laterally opposing side cavities and laterally extending tread grooves that are substantially offset relative to the side cavities.

In one embodiment, the polyurethane prepolymer mixture may comprise the reaction product of a polyol and diphenylmethane diisocyanate (MDI). In such embodiments, the curative may comprise a diamine curative comprising methylenedianiline(MDA)-sodium salt complex. Optionally, the amount of free MDI in the prepolymer has been reduced, for example, reduced to an amount of from 0.1% to 7.0%, e.g., from 1.0% to 5.0% based on the total weight of the prepolymer mixture. Optionally, the amount of MDA that is not complexed with the sodium salt is less than from 0.05% to 2.0%, e.g. from 0.1% to 1.0% based on the total weight of the curative.

BRIEF DESCRIPTION OF THE DRAWINGS

The foregoing and other objects and advantages of our invention will appear more fully from the following description, made in connection with the accompanying drawings of non-limiting preferred embodiments of the inventions, wherein like characters refer to the same or similar parts throughout the views, and in which:

FIG. 7C is a front view of the bottom half shown in FIG. 7B; and

FIG. 7D is a side view of a closed mold shown in FIGS. 7A, 7B, and 7C.

DETAILED DESCRIPTION OF THE PREFERRED EMBODIMENTS

The invention is directed to tires and, more specifically, to non-pneumatic tires preferably capable of carrying extreme loads. In one embodiment, the invention relates to a non-pneumatic tire having: (a) side cavities that are staggered with respect to laterally opposing side cavities; and (b) laterally extending tread grooves that are in substantial radial alignment with the cavities. In another embodiment, the invention relates to a non-pneumatic tire having: (a) side ribs (which preferably define the above-described cavities) that are staggered with respect to laterally opposing side ribs; and (b) laterally extending tread grooves that are substantially offset relative to the ribs. As used herein, the term "lateral" and variations thereof refers to the direction substantially parallel to the axis of rotation of the tire or tire rim. The ribs, side cavities and/or tread grooves may be formed together in the same mold to structurally integrated the ribs, side cavities and/or tread grooves. Tires according to the invention ideally are well-suited for off-the-road (OTR) vehicles and applications and are preferably capable of individually withstanding tremendous loads of, for example, greater than 5 tons, greater than 30 tons or greater than 65 tons.

According to one embodiment of the invention, circumferentially adjacent cavities in the tire are separated from one another by the ribs, which extend from a side of the tire to a central web. Like the cavities that are defined by the ribs, the ribs themselves preferably are staggered with respect to laterally opposing ribs. The ribs may be radially oriented, meaning the ribs extending in the radial direction relative to the tire's axis of rotation, or may be oriented at one or more angles relative to the radial direction. In the latter embodiment, the angle preferably is less than 60 degrees, e.g., less than 30 degrees, less than 20 degrees, less than 15 degrees, or less than 10 degrees, relative to the radial direction. In terms of ranges, the rib angle optionally is from 0 to 60 degrees, e.g., from 1 to 30 degrees, or from 5 to 25 degrees, relative to the radial direction. Generally, the smaller the angle, the greater the load the tire will be able to withstand and the longer the tire lifetime. For particularly heavy loads, the ribs preferably are radially oriented, i.e., oriented at 0 degrees relative to the radial direction. Conversely, the tires tend to exhibit greater compressibility, which may be desired, for example, for particularly rugged terrains, as the rib angle increases relative to the radial direction.

Figure 1A:
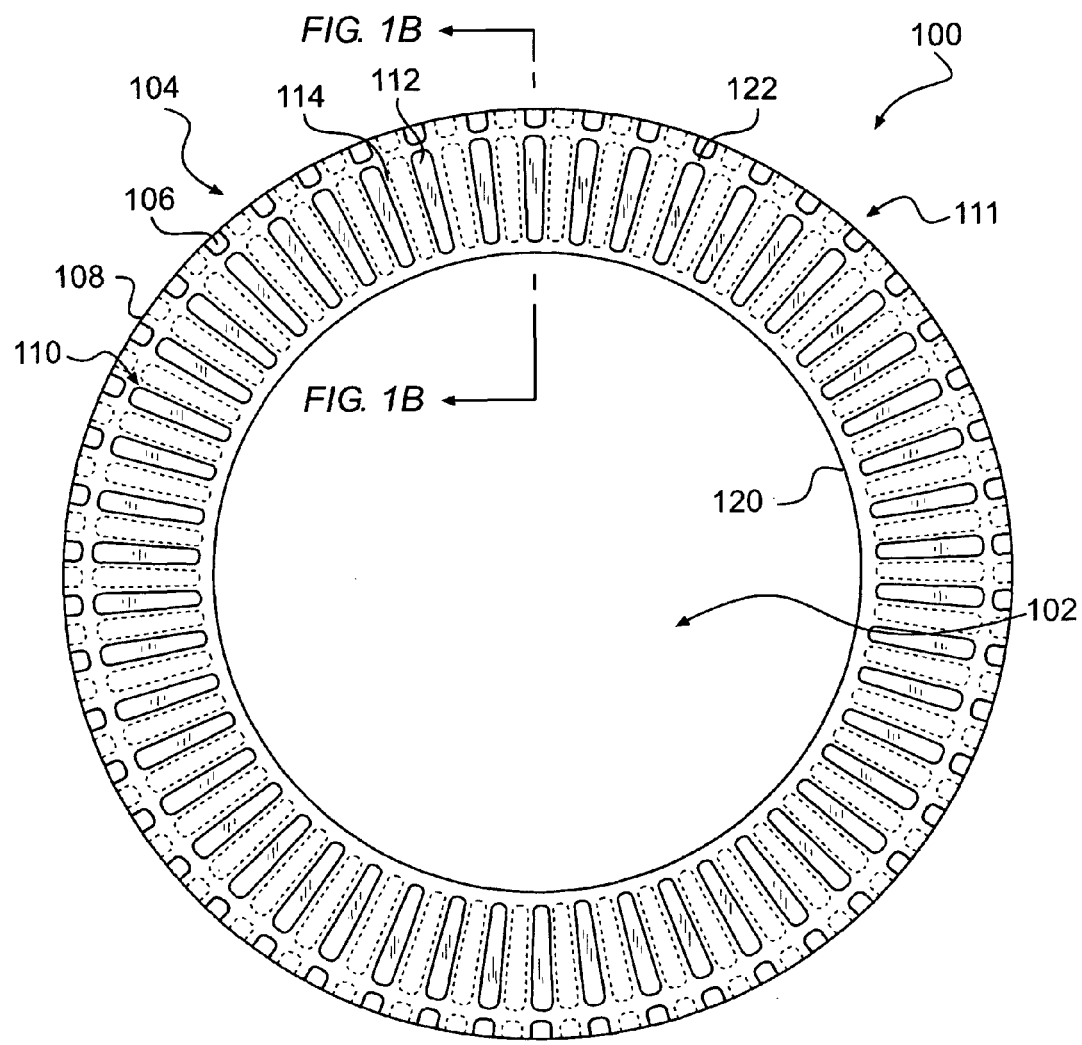
FIG. 1A is a side view of a tire constructed in accordance with one embodiment of the present invention in which laterally extending tread grooves are in substantial radial alignment with the cavities.
Figure 2A:
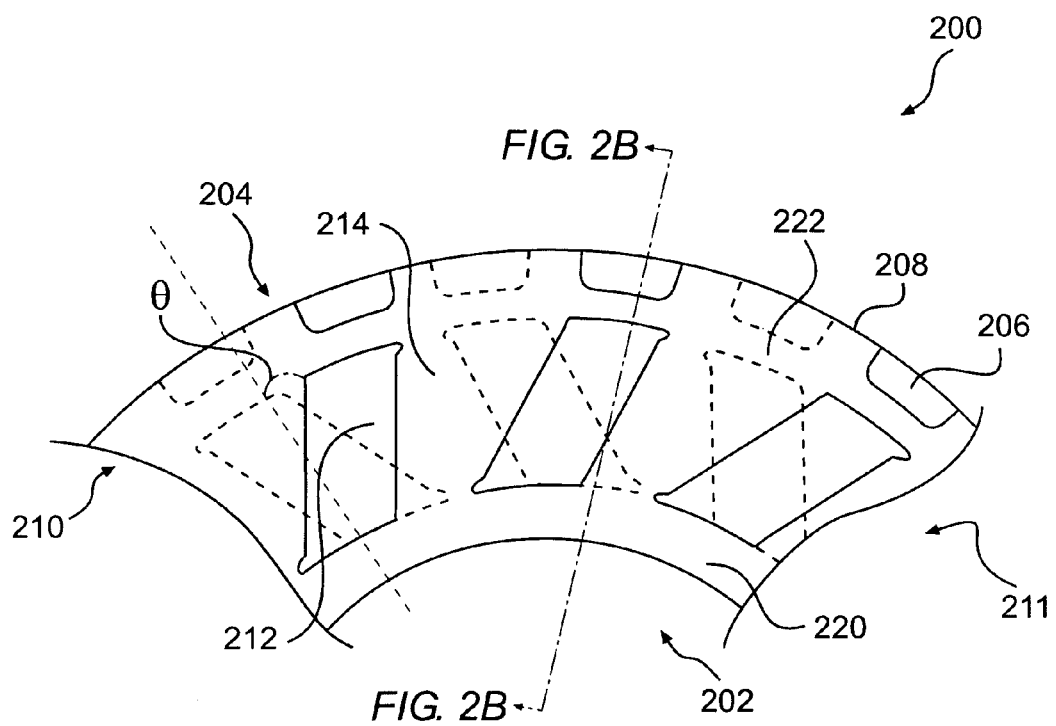
FIG. 2A is a side view of a tire having ribs and cavities that are angled relative to the radial direction in accordance with an embodiment of the present invention.

In those embodiments where the ribs are radially oriented, the cavities preferably are radially oriented as well as shown in FIG. 1A, meaning that the cavities are substantially aligned in a radial direction. The portion of a cavity that is adjacent the inner circumferential member or hoop may be smaller than the portion of the cavity that is adjacent the outer circumferential member or hoop. In this aspect, the sidewalls of the cavity preferably are substantially aligned in the radial direction although other configurations are also possible. In those embodiments where the ribs are oriented at an angle relative to the radial direction, the cavities may similarly be oriented at an angle relative to the radial direction. In various optional embodiments, the cavities may have a substantially triangular, substantially trapezoidal, or substantially parallelogram shape, as shown in FIG. 2A.

As indicated above, the tire preferably includes a central web. The central web preferably is oriented in an imaginary plane (the "equatorial plane"), which is perpendicular to the axis of rotation (the "central axis") and centrally located relative to the sidewalls of the tire. In one aspect, the tire has an inner circumferential member or hoop and an outer circumferential member or hoop, and the central web connects the inner and outer circumferential members, as well as provides a surface upon which the ribs on adjacent sides of the central web are secured. Thus, the central web conceptually separates the ribs and cavities on one lateral side of the tire from those on the other lateral side of the tire. That is, the central web preferably separates laterally opposing side cavities and laterally opposing ribs. The presence of a central web has been shown to significantly increase tire strength and tire lifetime.

The specific form or design of the tread may vary widely. As indicated above, however, the tread preferably comprises laterally extending tread grooves that are substantially offset relative to the ribs. By being "substantially offset" relative to the ribs it is meant that the laterally extending tread grooves do not substantially overlap radially underlying ribs at the portion, e.g., wall, where the rib meets the outer circumferential member or hoop. Thus, in those embodiments where the ribs, and hence the cavities, are angled relative to the radial direction, a tread groove is considered "offset" with a radially underlying rib when the groove does not substantially overlap the radially underlying rib at the wall where the rib that meets the outer circumferential member or hoop, regardless of the location where the rib connects with the inner circumferential member or hoop.

Additionally or alternatively, the tread may comprise laterally extending tread grooves that are substantially aligned with the cavities. By "substantially aligned" with the ribs it is meant that a laterally extending tread groove is in substantial radial alignment with an underlying cavity in a region where the cavity connects with the outer circumferential member or hoop. Thus, in those embodiments where the ribs are angled relative to the radial direction, a tread groove is considered "substantially aligned" with a cavity if the groove substantially overlaps a radially underlying cavity in a region where the cavity connects with the outer circumferential member or hoop regardless of the location where that cavity connects with the inner circumferential member or hoop. Of course, the tread employed may include other tread features in addition to the aforementioned tread grooves.

Since, in one embodiment, the side cavities are staggered with respect to laterally opposing side cavities and laterally extending tread grooves are substantially offset relative to the ribs (or in substantial radial alignment with the cavities), the number of laterally extending tread grooves generally corresponds with the number of cavities (as well as the number of ribs) in the tire. In some embodiments, there may be one or more tread grooves that each align relative to the cavities. The ratio of the number of cavities to the number of tread grooves preferably ranges from 1:1 to 4:1 or from 1:1 to 2:1. Similarly, the ratio of the number of ribs to tread grooves is preferably ranges from 1:1 to 4:1 or from 1:1 to 2:1.

In this first configuration, where tread grooves are in substantial radial alignment with the cavities and offset relative to the ribs, the shear stress may be reduced. The reduction may be approximately 5% to 50%, e.g. 10% to 30%, as compared to a tire where the grooves are aligned with the ribs on the same sidewall. FEA shows a reduction of stress distribution of approximately 25% as compared to a tire having grooves that are aligned with the ribs and offset relative to the cavities.

In a second embodiment of the present invention, the invention is directed to a non-pneumatic tire having: (a) side cavities that are staggered with respect to laterally opposing side cavities; and (b) laterally extending tread grooves that are substantially offset relative to the cavities. Defined in another manner, in the second embodiment, the present invention relates to a non-pneumatic tire having: (a) side ribs (which preferably define the above-described cavities) that are staggered with respect to laterally opposing side ribs; and (b) laterally extending tread grooves that are in substantial radial alignment with the ribs. As described above with respect to the first embodiment, the ribs and/or cavities of this embodiment may be radially oriented or angled relative to the radial direction. One advantage of the second embodiment is that the non-pneumatic tire may provide a quieter and softer ride, but with increased amounts of stress.

In a third embodiment of the present invention, the tread grooves that extend from one sidewall may be in substantial radial alignment with the cavities and substantially offset relative to the ribs on that sidewall, while the tread grooves extending from the opposing sidewall may be substantially offset relative to the cavities on the opposing lateral side and in substantial radial alignment with the ribs on that opposing lateral side. In such configurations, the tread grooves from each sidewall may be laterally in line with one another and not overlapping at the equatorial plane, or, in an alternative configuration, may extend the entire lateral width of the tire and open or terminate at both sidewalls.

Optionally, the width of each laterally extending tread groove decreases from the portion of the tread groove adjacent to the sidewall of the tire toward the axial plane, i.e., centerline, of the tire. That is, the tread grooves optionally extend laterally across the width of the tire and open towards one of the sidewalls near the shoulder of the tire. Thus, the tread grooves may take on an acute triangular form, preferably an isosceles triangular form, with the smallest angle of the triangular form pointing toward the equatorial plane of the tire. In some other aspects, the tread grooves extend across the equatorial plane of the tire, in which case the smallest angle of the triangular form may point to the opposing sidewall rather than to the equatorial plane of the tire. Employing acute triangular tread grooves may be particularly desirable for facilitating removal of the tire from its mold during the manufacturing process, described below.

As indicated above, in various embodiments, the tire of the present invention may include a configuration having: (1) laterally extending tread grooves that are substantially offset relative to the ribs or which are in substantial radial alignment with the cavities, (2) laterally extending tread grooves that are substantially offset relative to the cavities or which are in substantial radial alignment with the ribs, or (3) a hybrid combination of both. The tread grooves preferably are molded into, e.g., embedded in, the outer circumferential member or hoop so as to provide traction for the tires. The tread grooves preferably extend from the sidewalls of the tire inwardly toward the equatorial plane of the tire. Thus, in some aspects, the tire includes two sets of tread grooves: one set substantially oriented on a first lateral side of the equatorial plane of the tire and a second set substantially oriented on a second lateral side of the equatorial plane of the tire. It is also contemplated, as indicated above, that some or all of the tread grooves may extend (optionally slightly extend) across the equatorial plane of the tire to the other lateral side of the tire. Thus, in some embodiments, no portion of either set of tread grooves overlaps in a circumferential direction with tread grooves from the other set of tread grooves. In other embodiments, at least some portion of the tread grooves from one set of tread grooves overlaps in a circumferential direction with tread grooves from the second set of tread grooves, and vice versa.

As indicated above, in one embodiment, the cavities in each sidewall are substantially staggered or offset relative to cavities on the opposing sidewall. A central web preferably separates the cavities of each sidewall from the cavities on the opposing sidewall. The cavities preferably extend substantially perpendicularly relative to a plane of the sidewall from the sidewall (e.g., preferably extend in a substantially lateral direction) toward the central web, i.e., toward the axial plane. In another aspect, the cavities extend toward the central web from the sidewall at an angle relative to the lateral direction. In this latter aspect, in order to facilitate mold removal during tire manufacture, the cross-sectional area of each cavity preferably decreases in a direction from the sidewall toward the central web. In one embodiment, the substantially staggered cavities are such that the geometric centers of laterally opposing cavities on opposite sidewalls are not coincident with each other.

As indicated above, the tire has a plurality of ribs that separate cavities and extend between the inner circumferential member or hoop and the outer circumferential member or hoop. The inner circumferential member or hoop is preferably mountable on a rim and the outer circumferential member or hoop includes the tire tread (which includes the tread grooves) on the outer surface thereof. It should be understood that the inner circumferential member or hoop and the outer circumferential member or hoop comprise an unitary structure that is integrally formed from the same material.

The above-described tire configurations of the present invention are particularly suited for tires having a rim with a diameter of at least 80 inches (203 cm), e.g., at least 110 inches (279 cm), or at least 140 inches (356 cm), such as tires used for off-the-road (OTR) vehicles, although the tires may also be employed on rims with smaller diameters. In the embodiment where the ribs are staggered with respect to laterally opposing ribs and the opposing side cavities are separated by a central web there is a beneficial relationship between the ribs and the central web. The synergy between the cavities, ribs and grooves increases the buckling deflection, thus allowing the part of the tire to deflect more and carry more load than would otherwise be expected. In some embodiments, the tires of the invention may be capable of supporting OTR vehicles with operational weights as high as 380 to 460 tons. An additional benefit is that the increased tire strength may allow for a reduction in the amount of tire material for a given load, which reduces the tire weight and maximizes material efficiency. Further, the improved strength in the tires of the present invention preferably provide increased tire lifetime relative to conventional pneumatic and non-pneumatic tires. In one embodiment the width of the central web is less than the width of each rib.

The tires of the present invention preferably are non-pneumatic, meaning that the tires are made of a solid material that does not require inflation to be operational. Non-pneumatic tires do not have the risks associated with tire failures, blowouts, or punctures associated with pneumatic tires. An additional benefit of non-pneumatic tires is that even in the event of a tire failure, the tire may be driven on so that the vehicle, e.g., OTR vehicle, can be moved to a maintenance facility without requiring expensive or time-consuming towing.

Suitable materials for non-pneumatic tires include elastomeric materials, such as those described in U.S. Pat. No. 4,832,098, U.S. Pat. No. 4,934,425, U.S. Pat. No. 4,921,029, U.S. Pat. No. 4,784,201, U.S. Pat. No. 5,605,657, and U.S. application Ser. No. 09/919,994, filed on Aug. 2, 2001, the entire contents and disclosure of which are hereby incorporated by reference. One exemplary material may be a polyurethane elastomer comprising a prepolymer formed from a diisocyanate and a polyol, e.g. polycaprolactone, polyester, poly(tetramethylene ether) glycol (PTMEG), etc., that is cured with diamine curative such as 4,4'-methylene-bis(2-chloroaniline) (MBCA); 4,4'-methylene-bis(3-chloro-2,6-diethylaniline (MCDEA); diethyl toluene diamine (DETDA; Ethacure™ 100 from Albemarle Corporation); tertiary butyl toluene diamine (TBTDA); dimethylthio-toluene diamine (Ethacure™ 300 from Albemarle Corporation); trimethylene glycol di-p-amino-benzoate (Vibracure™ A157 from Chemtura Company, Inc. or Versalink™ 740M from Air Products and Chemicals); methylene bis orthochloroaniline (MOCA), methylene bis diethylanaline (MDEA); methylenedianiline (MDA); and MDA-sodium chloride complex (Caytur™ 21 and 31 from Chemtura Company). Exemplary elastomeric materials suitable for non-pneumatic tires include polyurethanes such as those formed from commercially available Adiprene™ polyurethane prepolymers and Caytur™ diamine curatives from Chemtura Corp., a segmented copolyester such as Hytrel 5556 from DuPont, a reaction injection molded material, and a block copolymer of nylon such as Nyrim from Monsanto Chemical Co. In this disclosure, polyurethane refers to polymer with urethane linkages (derived from an isocyanate group and a hydroxyl group) and optionally, urea linkages as well (derived from an isocyanate group and an amine group). Examples of such polyurethane elastomers are disclosed in U.S. Pat. Nos. 5,077,371, 5,703,193, and 6,723,771, and U.S. application Ser. No. 11/702,787, filed on Feb. 5, 2007, the entire contents and disclosure of which are hereby incorporated by reference.

In one preferred embodiment, the elastomeric material comprises a temperature de-blocked polyurethane elastomer. Such polyurethane elastomers may comprise a mixture of a polyurethane prepolymer formed from a polyol, e.g. polycaprolactone, polyester, poly(tetramethylene ether)glycol (PTMEG), etc., and a diphenylmethane diisocyanate (MDI) preferably having a low free MDI content from 0.1% to 7.0%, e.g., from 1.0% to 5.0% based on the total weight of the prepolymer mixture, and a curative having a low free methylenedianiline (MDA) content from 0.05% to 2.0%, e.g. from 0.1% to 1.0% based on the total weight of the curative. Such preferred polyurethane systems are disclosed in US Publication No. 2003/0065124, the entirety of which is incorporated herein by reference. A suitable low free MDI polyurethane prepolymer includes ADIPRENE™ LFM 2450, ADIPRENE™ LFM 2400, ADIPRENE™ LFM 1250, ADIPRENE™ LFM 500, and Vibrathane™ 8030 each made by Chemtura Corporation. A suitable low free MDA curative includes Caytur™ 21, Caytur™ 21-DA, Caytur™ 31, Caytur™ 31-DA each made by Chemtura Corporation.

Figure 1B:
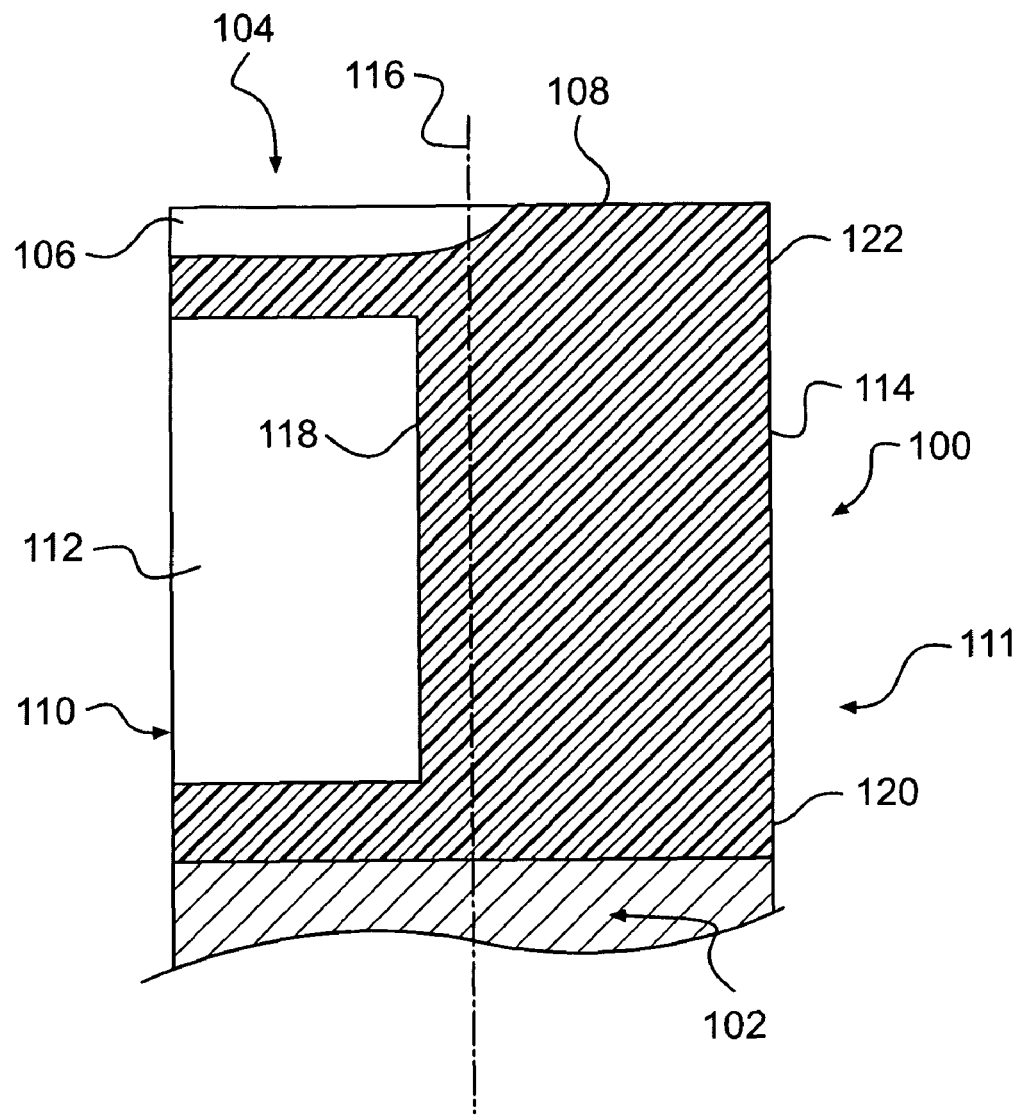
FIG. 1B is a cross-view the tire in FIG. 1A.
Figure 1C:
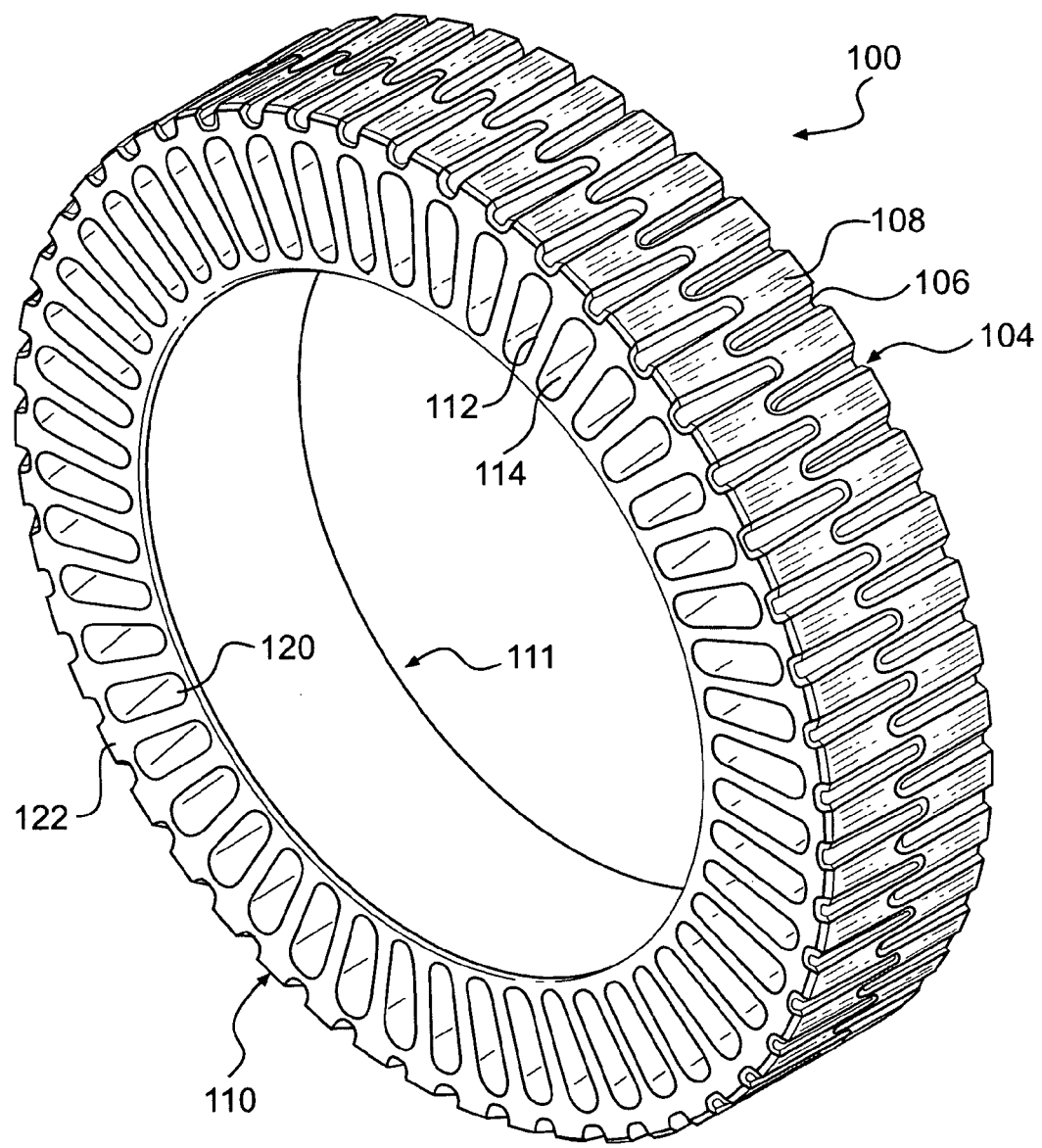
FIG. 1C is a perspective view of the tire in FIG. 1A.

Non-limiting FIGS. 1A, 1B and 1C illustrate a tire according to one embodiment of the present invention. As shown, cavities 112 extend in a radial direction from the center axis of exemplary tire 100. Tire 100 is mountable to a rim, not shown, which would be in central region 102.

In embodiments of the present invention, tire 100 is preferably removably mountable to a rim in central region 102. In one embodiment, tire 100 is molded onto or adhered with an adhesive or bonding agent to a mounting ring, e.g., a metal mounting ring, which may slideably engage the rim. Suitable mounting rings include those described in co-pending U.S. Ser. No. 12/036,964, entitled "Tire and Tire Rim Assembly," filed on Feb. 25, 2008, the entire contents and disclosure of which is hereby incorporated by reference. In one embodiment, tire 100 is molded onto or adhered to the rim, without using a mounting ring. In another embodiment, tire 100 is pressed onto the rim which creates an interference fit when mounted such that the friction between the tire and rim holds the tire in place. In one embodiment, the interference fit may be created by heating the rim and band using torches or gas ovens and assembling into position while in their hot, expanded, freely sliding state. While cooling both parts are contracted back to their former size, except for the compression that results from the rim interfering with the band. In another embodiment, the band of the tire is pressed on to the rim using a press or jack to create the interference fit. It should be understood to those skilled in the art that tire 100 may be mounted to rim using a variety of other methods without departing from the scope of the present invention.

Tire 100 comprises a tread pattern 104 having a plurality of tread grooves 106 and tread footprints 108 in a first configuration as discussed above. It should be understood that in other embodiments, tire 100 may comprise the second or third configurations as discussed above. Tread footprint 108 is the portion of tread pattern 104 that is in contact with the ground or other similar surface. It should be readily understood that tire pattern 104 is continuous around the outer circumference of tire 100, although the opposite sides of the tire preferably include separate sets of tread grooves, which are substantially offset with respect to one another, as described above. Tire 100 also comprises two sidewalls 110, 111, each having a plurality of staggered cavities 112 separated by ribs 114. Cavities 112 extend from a plane perpendicular to sidewalls 110, 111 towards equatorial plane or centerline 116. Oriented about equatorial plane 116 is central web 118. Cavities 112 are separated from the rim region 102 by inner circumferential member or hoop 120 and from tread pattern 104 by outer circumferential member or hoop 122. Cavities 112, ribs 114, central web 118 and tread grooves 106 are molded in the same mold and are structurally integrated.

As shown, each tread groove 106 extends laterally across a portion of the width of tire 100 and opens near the shoulder region of where tread pattern 104 adjoins each sidewall 110, 111. In the first configuration, tread grooves 106 are substantially offset relative to the ribs 114, but are in substantial radial alignment with, e.g., radially overlap, cavities 112 that are on the same sidewall 110 thereof. Tread grooves 106 alternate along tread pattern 104 as shown in FIG. 1C. As shown, tread grooves 106 extend in from the shoulder of tire 100 without bending or angling relative to the lateral direction as shown in FIG. 1C.

As shown in FIG. 1A, cavities 112 and ribs 114 extend in a radial direction from a center axis of tire 100. As used herein radially or radial refers to being in line with a direction that extends from the center axis of tire 100. As shown, radial cavities 112 have a substantially oval or trapezoidal shape with the distance between ribs 114 closest to rim 102 is less than the distance between the same ribs 114 closest to tread pattern 104 although other geometries may employed, as discussed above.

In the embodiment shown in FIG. 1B, each cavity 112 is defined by the inner circumferential member or hoop 120, an outer circumferential member or hoop 122 and adjacent ribs 114. As shown, staggered cavities 112 extend inward perpendicularly from a plane of sidewall 110 with substantially straight walls such that the open area of cavity 112 is approximate to the area of the cavity on web 118. In other embodiments, the walls of the cavities may be angled or designed with a draft, in which case the cross-sectional area of rib at the sidewall would be less than the cross sectional area of rib where it meets the central web. This latter embodiment may be desirable to facilitate removal of the tire from the mold during manufacturing as discussed above.

The staggered cavities 112 on sidewalls 110, 111 extend into tire 100 towards central web 118. On sidewall 111, cavities 112 are staggered or offset relative to cavities 112 on the other side of the central web 118, such that ribs 114 on sidewall 110 laterally align with cavities 112 on opposing sidewall 111, and vice versa. Such staggering of cavities 112 reduces the amount of material used in the mold when making a tire of the present invention while maintaining desirable strength, durability and lifetime characteristics for the tire. The configuration of cavities 112, ribs 114, and grooves 106 act together to strengthen central web 118 and the overall tire 100.

In the embodiment of FIGS. 1A-1C, cavities 112 and tread grooves 106 are radially aligned relative to each other and create a pattern as follows. On one sidewall 110, ribs 114 are in substantial radial alignment with corresponding footprints 108, while on the opposing sidewall 111 a cavity 112 is in substantial radial alignment with tread groove 106. This alternating pattern between tread pattern 104 and sidewalls 110, 111 repeats for the entire circumference of tire 100.

The number of cavities 112, ribs 114 and grooves 106 may vary depending on the configuration of tire 100. The tire may have, for example, from 10 to 80 cavities, or more preferably from 25 to 60 cavities on each sidewall (twice as many in the overall tire). The tire may similarly have, for example, from 10 to 80 ribs, or more preferably from 25 to 60 ribs on each sidewall (twice as many in the overall tire). The tire optionally may also have from 0 to 320 tread grooves, or more preferably 40 to 120 tread grooves on each side of the tire (twice as many in the overall tire). Embodiments with zero grooves may be referred to as slick tires which lack a tread pattern. In one embodiment a tire has the same number of cavities, ribs and grooves.

The dimensions of tire 100 may be affected by various design parameters such as ground pressure (traction), vertical spring rate (ride), cornering power (handling), total deflection, material volume, and tire weight. For example, tire 100 has an outer diameter that may range from 25 inches (64 cm) to 190 inches (483 cm), e.g. from 60 inches (152 cm) to 159 inches (404 cm) or from 63 inches (160 cm) to 100 inches (254 cm). An inner diameter that may range from 20 inches (51 cm) to 140 inches (356 cm), e.g. from 30 inches (76 cm) to 110 inches (279 cm) or from 40 inches (102 cm) to 80 inches (203 cm). A tread width that may range from 15 inches (38 cm) to 70 inches (178 cm), e.g. from 20 inches (51 cm) to 59 inches (150 cm) or from 26 inches (66 cm) to 29 inches (74 cm). The height of sidewall may range from 2 inches (5 cm) to 110 inches (279 cm), e.g. from 5 inches (13 cm) to 80 inches (203 cm) or from 15 inches (38 cm) to 50 inches (127 cm). Each cavity may have a depth ranging from 5 inches (13 cm) to 20 inches (51 cm), e.g. from 8 inches (20 cm) to 15 inches (38 cm) or from 10 inches (25 cm) to 13 inches (33 cm). Each rib may have a thickness ranging from 2 inches (5 cm) to 15 inches (38 cm), e.g. from 5 inches (13 cm) to 13 inches (33 cm) or from 8 inches (20 cm) to 11 inches (28 cm). Web may have a thickness ranging from 4 inches (10 cm) to 14 inches (36 cm), e.g. from 4.5 inches (11 cm) to 12 inches (30 cm) or from 5 inches (13 cm) to 10 inches (25 cm). Grooves may have a depth from 0.25 inches (1 cm) to 12 inches (30 cm), e.g. from 2 inches (5 cm) to 8 inches (20 cm) or from 2.5 inches (6 cm) to 8 inches (15 cm), and a lateral length of less than 30 inches (76 cm), e.g. less than 25 inches (64 cm) or less than 20 inches (51 cm).

The tire assembly of the present invention may support 20,000 to 200,000 lbs per tire (9,000 kg to 91,000 kg per tire), e.g. 40,000 to 150,000 lbs per tire (18,000 kg to 68,000 kg per tire) or 60,000 to 100,000 lbs per tire (27,200 kg to 45,400 kg per tire). In one embodiment, a tire assembly of the present invention may support such weighs when the vehicle is traveling of speeds in the range from 0 to 60 mph (0 to 97 km/hr), e.g. 5 to 40 mph (8 to 64 km/hr) or 20 to 30 mph (32 to 48 km/hr). Each of the tires may weigh approximately 500 lbs (227 kg) to 15,000 lbs (6,804 kg), e.g., 2,000 lbs (907 kg) to 10,000 lbs (4,535 kg) or 6,000 lbs (2721 kg) to 8,000 lbs (3,629 kg).

Figure 2B:
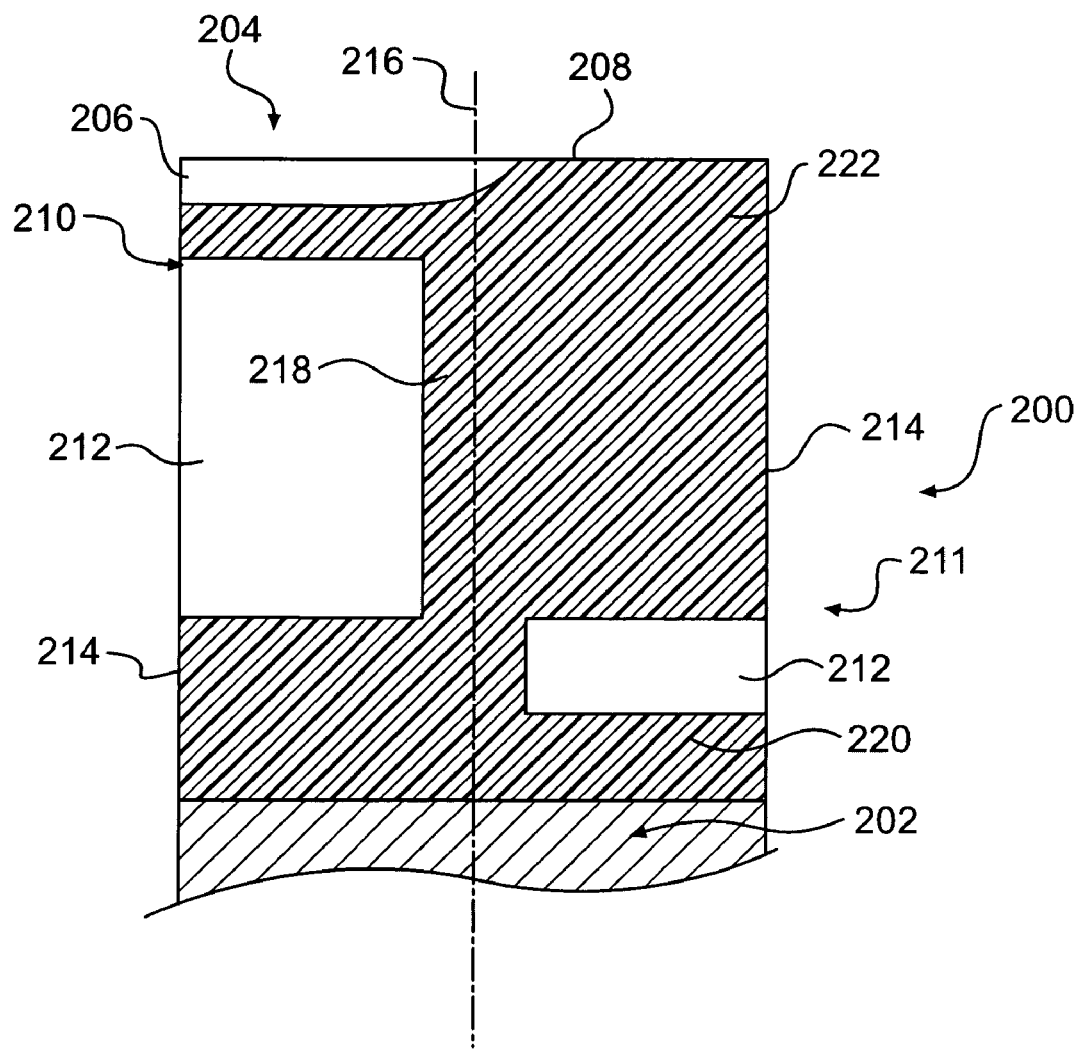
FIG. 2B is a cross-view of the tire in FIG. 2A.

In another embodiment of the present invention, the staggered cavities are angled relative to the radial direction as shown in exemplary tire 200 of FIGS. 2A and 2B. Similar to FIGS. 1A-1C, tire 200 comprises a rim 202 (not shown), tread pattern 204, tread grooves 206, tread footprints 208, sidewalls 210, 211, cavities 212, ribs 214, web 218, inner circumferential member or hoop 220 and outer circumferential member or hoop 222. Web 218 extends along a equatorial plane or centerline 216 of tire 200 and separates cavities 212 on each sidewall 210, 211. Unlike cavities 112 in FIGS. 1A-1C, cavities 212 in FIGS. 2A and 2B are offset from the radial direction by angle 0, as described above. Changing angle 0 with respect to the radial direction effectively varies the spring rate of tire 200.

In FIG. 2A cavities 212 on each sidewall 210, 211 are positioned in the opposite offset direction as shown in U.S. Pat. No. 4,832,098, U.S. Pat. No. 4,934,425, U.S. Pat. No. 4,921,029, and U.S. Pat. No. 4,784,201, the entire contents and disclosure of which are hereby incorporated by reference.

As discussed above, for purposes of the present specification, ribs 214 that are angled relative to the radial direction are considered to be in substantial radial alignment with tread grooves 206 if the ribs are radially aligned with tread grooves at the position where the ribs adjoin outer circumferential member 222. As shown, at the position where rib 214 adjoins outer circumferential member or hoop 222, there is a tread groove 206, and ribs 214 of tire 200 are considered to be in substantial radial alignment with tread grooves 206. On the opposing sidewall 211 at this position, rib 214 would be laterally aligned with an opposing cavity 212. Conversely, on opposing sidewall 211, cavity 212 would be aligned relative to groove where cavity 212 adjoins outer circumferential member of hoop 222. This configuration repeats throughout the circumference of the tire. In another aspect, not shown, the angled ribs may be substantially offset relative to the tread grooves (e.g., the cavities may be in substantial radial alignment with the tread grooves).

In one embodiment, the tire is solid and has a unitary, i.e., integral, structure that comprises a tire and tread formed together and made of the same composition. A unitary structure is configured so that the web and rib structures provide a load-carrying structure with substantially uniform deformation due to compression of the tire as the tire rotates during operation. The thickness of the web, the ribs and the hoops are such that there is essentially no sidewall bulge of the tire during operation. In addition, the tire may deform without buckling, due to compression during normal operation, but the tire is configured to allow the ribs to buckle, either individually or severally, when the tire runs over a projection on the ground. The word "buckle" as used herein is defined as a relatively sudden and radical deformation as a result of compression loading that exceeds a certain critical load value. In addition, the tires of the present invention, particularly those having radially oriented ribs, tend to exhibit improved envelopment of road hazards relative to conventional solid non-pneumatic tires due to this buckling behavior resulting in reduced impact forces on the vehicle.

The ability of tires configured in accordance with some embodiments of the present invention to be deformed yet return to its cylindrical shape essentially instantaneously under compression and sudden transitions of loading requires that the tires withstand a maximum strain of from 10% to 30%, e.g., from 15% to 20%, during normal operation yet buckle locally to absorb the sudden impact of a projecting object, or ground surface irregularity. It is this unexpected ability, derived from its unique construction from the elastomer, which gives such tires the handling and ride characteristics suitable for OTR vehicles.

Figure 3A:
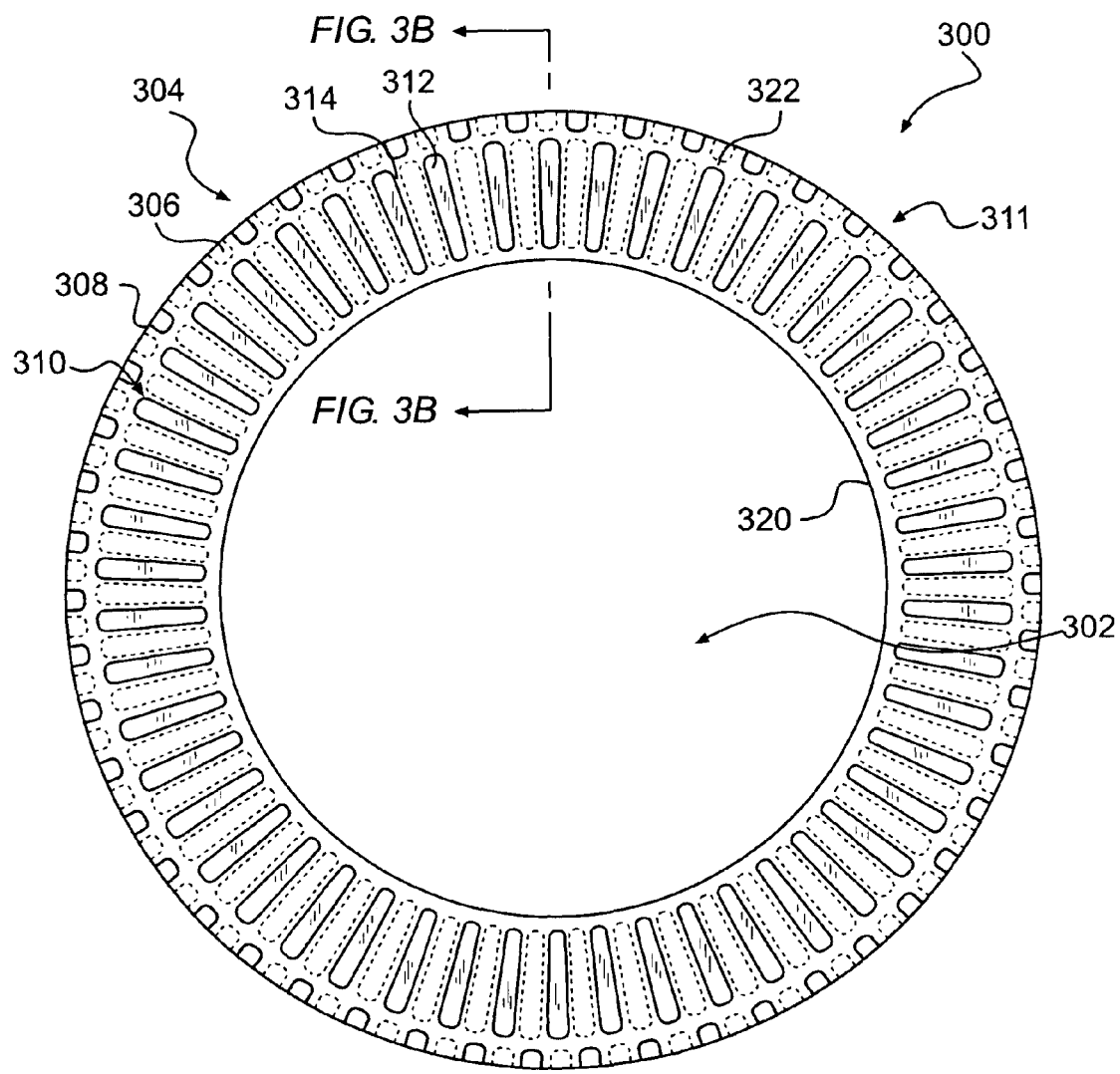
FIG. 3A is a side view of a tire having laterally extending tread grooves that are in substantial radial alignment with the ribs in accordance with an embodiment of the present invention.
Figure 3B:
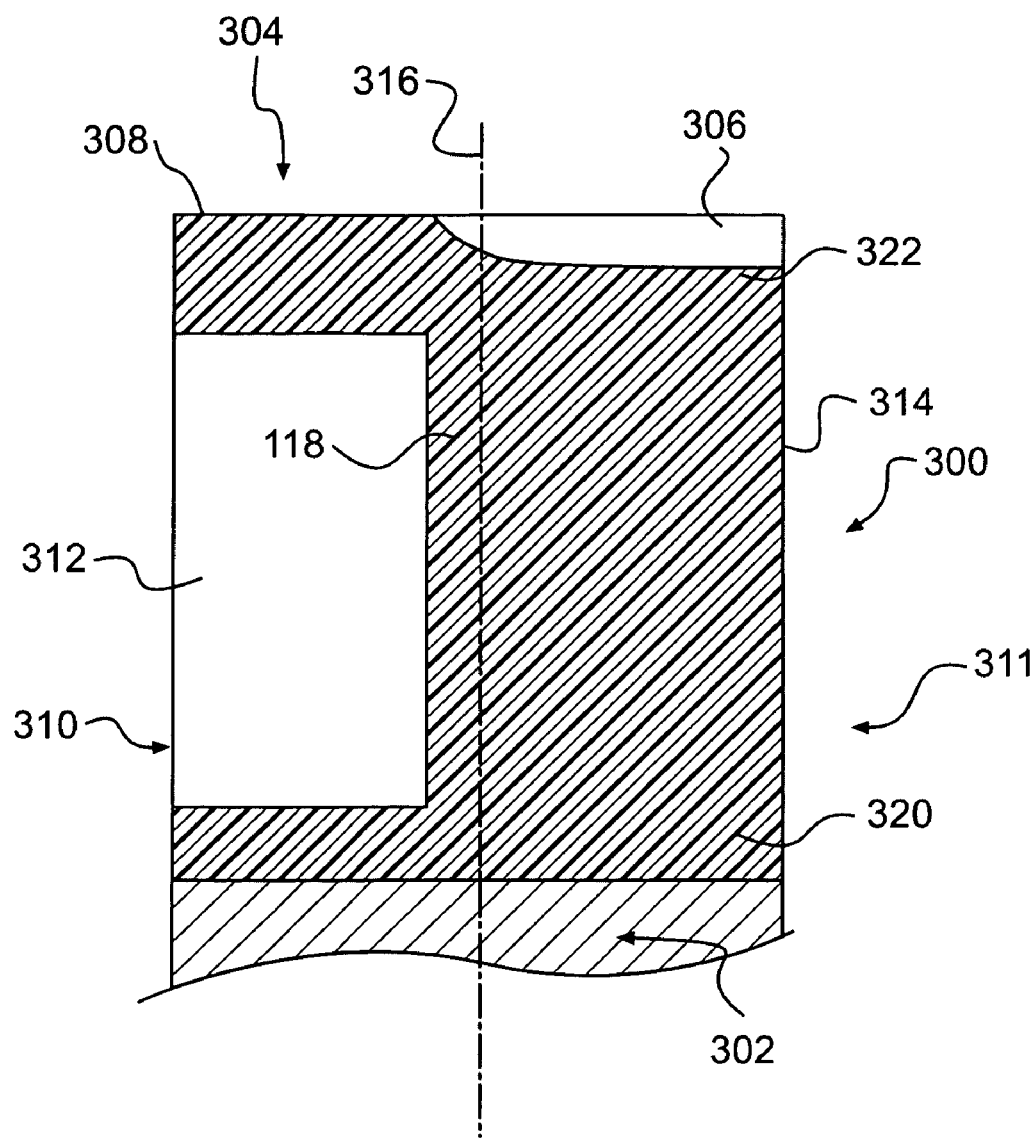
FIG. 3B is a cross-view the tire in FIG. 3A.

Non-limiting FIGS. 3A, and 3B illustrate an exemplary tire according to the second embodiment of the present invention. Tire 300 comprises a central region 302, tread pattern 304, tread grooves 306, tread footprints 308, sidewalls 310, 311, cavities 312, ribs 314, central web 318 oriented about equatorial plane or centerline 316, inner circumferential member or hoop 320, and outer circumferential member or hoop 322. Cavities 312 and tread grooves 306 are radially offset relative to each other in the second configuration and create a pattern as follows. On one sidewall 310, ribs 314 are in substantial radial alignment with corresponding grooves 306, while on the opposing sidewall 311, cavity 312 is in substantial radial alignment with tread footprints 308. This alternating pattern between tread pattern 304 and sidewalls 310, 311 repeats for the entire circumference of tire 300. As shown, cavities 312 extend in a radial direction from the center axis of exemplary tire 300 similar to FIG. 1A.

The second configuration shown in FIGS. 3A and 3B may be combined with the angled ribs, shown in FIGS. 2A and 2B, in another embodiment of the present invention.

Figure 4:
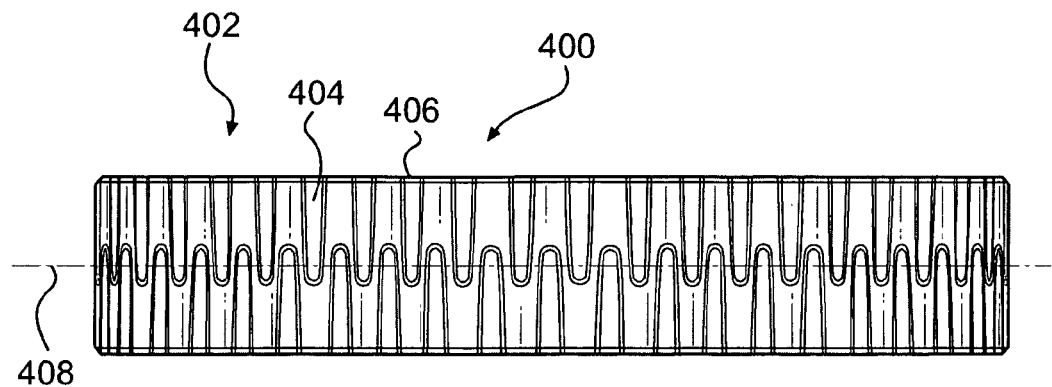
FIG. 4 is a front view of a tread pattern that crosses the equatorial plane in accordance with an embodiment of the present invention.
Figure 5:
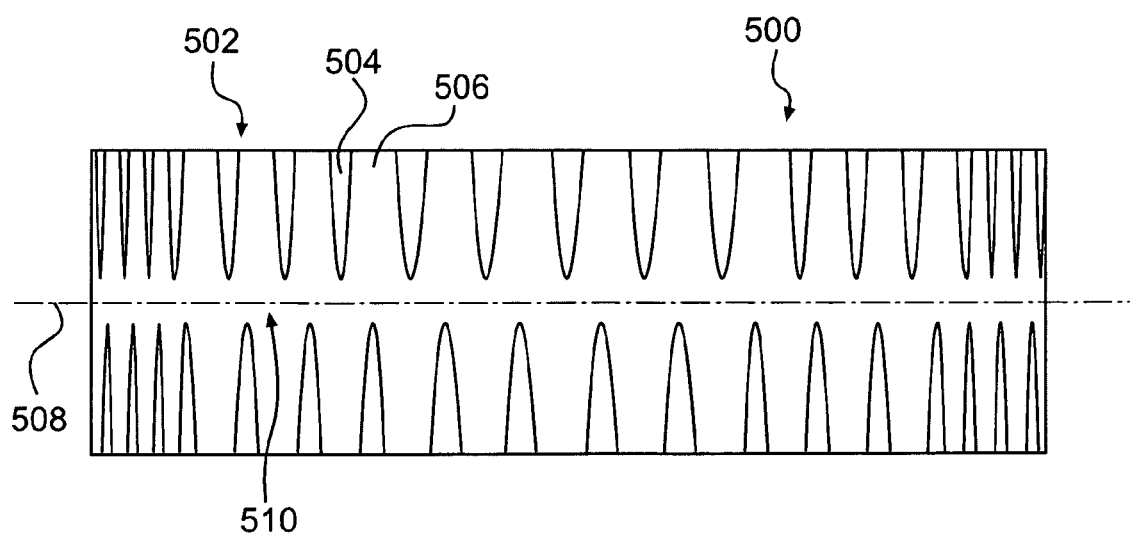
FIG. 5 is a front view of a tread pattern having a continuous footprint along the equatorial plane in accordance with an embodiment of the present invention.

In one embodiment the tread is formed together with the sidewalls using the same materials and mold. In other embodiments, a rubber tread may be added to tires of the present invention. Embodiments of the present invention may be used with various tread patterns as shown in FIGS. 4-5. FIG. 4 is a front view of a tire 400 having a tread pattern 402 in accordance with one embodiment of the present invention. Each tread groove 404 extends from a shoulder 406 and crosses equatorial plane 408. In such embodiments, tread grooves 404 remove some material from web (not shown) positioned in line with equatorial plane 408. Even though the web has less material, the overlapping position of groove 404 with respect to the sidewall cavities, as shown in FIG. 1C, unexpectedly provides sufficient strength for tire 400 and reduced stress and strain distribution across the tread.

FIG. 5 is a front view of a tire 500 having a tread pattern 502 in accordance with another embodiment of the present invention. As shown, each tread groove 504 extends from a shoulder 506 and ends short of a equatorial plane 508. The central web (not shown) is positioned in line with equatorial plane 508 and contacts the ground by a continuous footprint 510.

In one embodiment, a tire tread may combine grooves which extend past the equatorial plane with grooves that do not extend pass the equatorial plane.

In FIGS. 4 and 5, tread grooves 404, 504 have a similar shape and spacing around the outer circumference of tire 400, 500. The shapes of tread grooves may vary and include U-shaped grooves, V-shaped grooves, rectangular shaped grooves, etc. In one embodiment, grooves may have a flat bottom and tapered sides, with a curve at the end of groove. In another embodiment, the tread grooves may have a bottom that tapers up to the end of groove and tapered sides. Various other suitable shapes include those which allow for the easy removal of the mold used to make tire.

Figure 6:
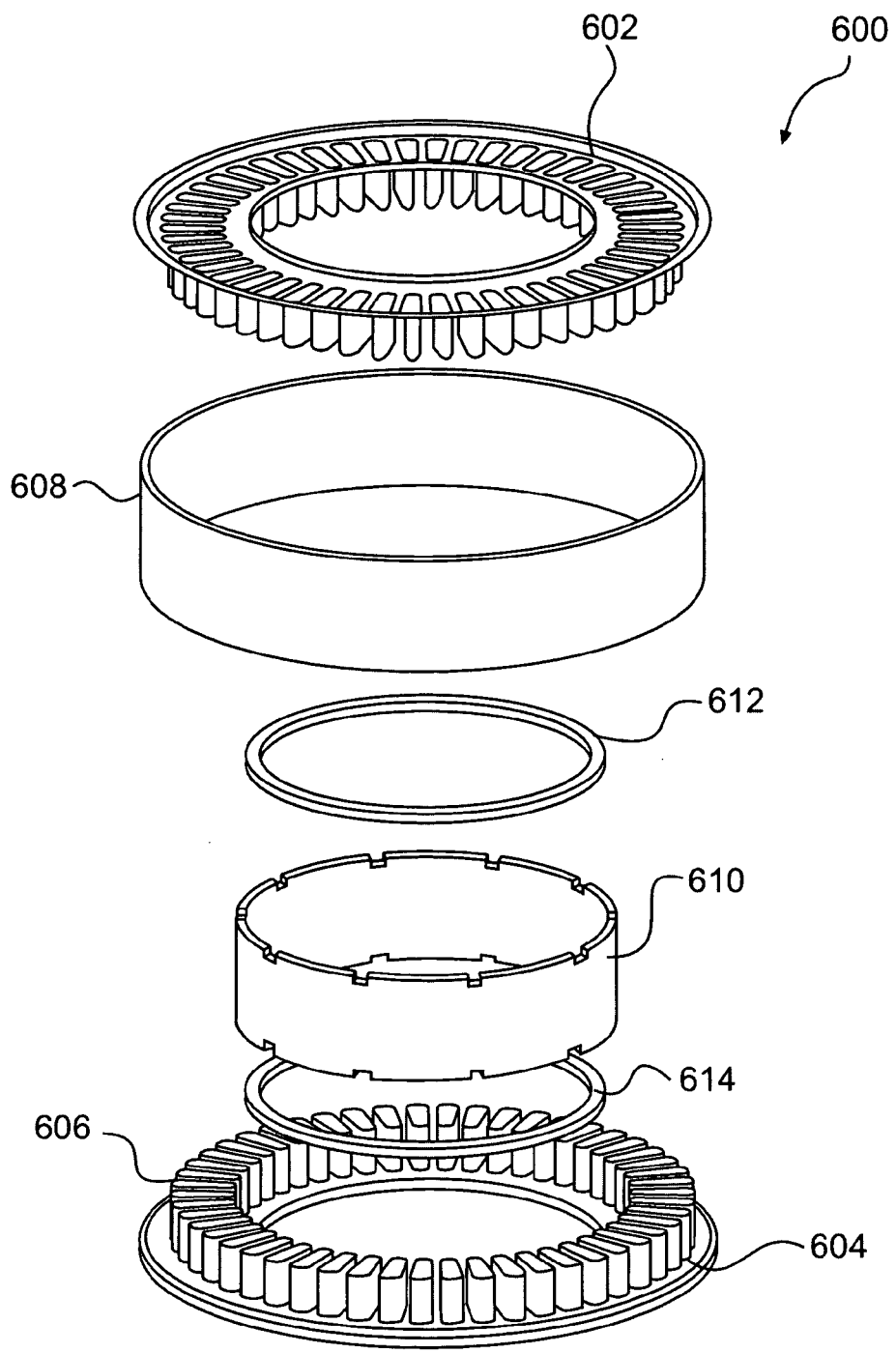
FIG. 6 is an exploded view of a tire mold in accordance with an embodiment of the present invention.

The tire of the present invention may be made using the following process and the exemplary mold assembly 600 shown in FIG. 6. Of course, other processes and mold designs may be used to form the tires of the present invention, and the process provided below is merely exemplary. Processes of the present invention provide for molding a tire having an outside diameter of approximately 25 inches (64 cm) to 190 inches (483 cm) and thus requires several tons of raw material or resin. As discussed above, a preferred polyurethane elastomer may comprise a low free MDI polyurethane prepolymer and a low free MDA curative.

The process of the present invention may be divided into two charging stages, for each material in the blend, and a molding stage. In the first charging stage, a drum containing low free MDI polyurethane prepolymer is melted at a temperature of 50±20° C. for at least 18 hours prior to use. Note that while one drum is discussed for purposes of clarity, multiple drums may be used depending on the size of the tire to be produced and size of the drums. While melting the prepolymer, a drum of the low free MDA curative is placed on a tumbler for at least 12 hours. In addition, the mold is heated to 45±20° C. Once the drum of low free MDI polyurethane prepolymer is melted, the polyurethane prepolymer is pumped into a mixing vessel. The low free MDI polyurethane prepolymer is pumped into the mixing vessel such that the exposure to air is minimized. Preferably the mixing vessel has a pressure of about 50 mBar absolute or lower. The vacuum pressure may have to be restored when pumping the low free MDI polyurethane prepolymer into the mixing vessel. Once the first charging stage is completed, a pressure of 20 mBar or less is applied to the mixing vessel and the low free MDI polyurethane prepolymer may be allowed to stand until substantially all bubbling has ceased, e.g. about 30 minutes.

Next, the second charging stage of the low free MDA curative is added to the mixing vessel. In this stage, the agitator of the mixing vessel should be operational to prevent an improper charging of the low free MDA curative. In one embodiment, the agitator should be operating at 50 rpm or greater. Improper loading of low free MDA curative may be exhibited by permanent white specks in the product. The low free MDA curative is added at a rate of about 4 kg/min to the mixing vessel under similar pressure as the first stage. The temperature of mixing vessel should be about 45±20° C. during the second stage. Once the second charging stage is completed, a pressure of 20 mBar or less is applied to mixing vessel and the mixture of low free MDI prepolymer and low free MDA curative may be allowed to degas under vacuum and agitation until substantially all bubbling has ceased, e.g. about 1 hour. In one embodiment, the mixing forms a blend of the low free MDA curative and low free MDI polyurethane. In one embodiment of the present invention it is advantageous to achieve a maximum temperature of the blend without curing the blend prior to pouring the mold.

After the charging steps, the blend is poured into the mold that is kept a low temperature, such as about 45±20° C., i.e. non-preheated. In some embodiments, release and bonding agents may be applied to different portions of the mold prior to adding the blend. The agitator is shut off and the mixture is filtered prior to being added to the mold. Once the mold is completely filled, the halves and/or plates of mold assembly are closed and clamped together. The mold temperature is raised to 125±25° C. for about 16 to 24 hours to fully cure the material. The mold is then opened and the tire is released. Alternately, the tire may be removed from the mold after approximately 4-8 hours at 125±25° C. depending on thickness and post cured at this temperature outside of the mold.

Various molds may be used to make the tires of the present invention. In FIG. 6 there is shown a mold 600 to make a tire having sidewall cavities. In FIGS. 7A-7D, there is shown a mold 700 to form a tire having structurally integrated ribs, sidewall cavities and tire tread grooves. In FIG. 6, mold 600 assembly comprises two halves 602, 604. Each half 602, 604 has inverse or negative protrusions 606 that correspond to the cavities of tire. Each half 602, 604 is preferably made from hardened steel, pre-hardened steel, aluminum, and/or beryllium-copper alloy. Each half 602, 604 may have a heating system (not shown), such as a jacket, positioned on the outside of mold assembly 600. For purposes of clarity half 602 will be referred to as the upper half and half 604 will be referred to as the lower half. On the outer circumference of upper half 602 and lower half 604 is a tread plate 608. Tread plate 608 may have a series of cavities that correspond to the tread pattern. Alternatively, the tread may be formed from protrusions (not shown) on either or both halves 602, 604. On the inner circumference there is a rim plate 610 with an upper sealing ring 612 and lower sealing ring 614. When assembled, tread plate 608 and rim plate 610 keep protrusions 606 of upper half 602 and lower half 604 from touching. In the space between cavities the web is formed in the mold. Various clamps may be used to hold mold assembly 600 together when curing the blend. Grooves may be added to the tire formed by mold 600 or mold 600 may form a slick tire.

Figure 7A:
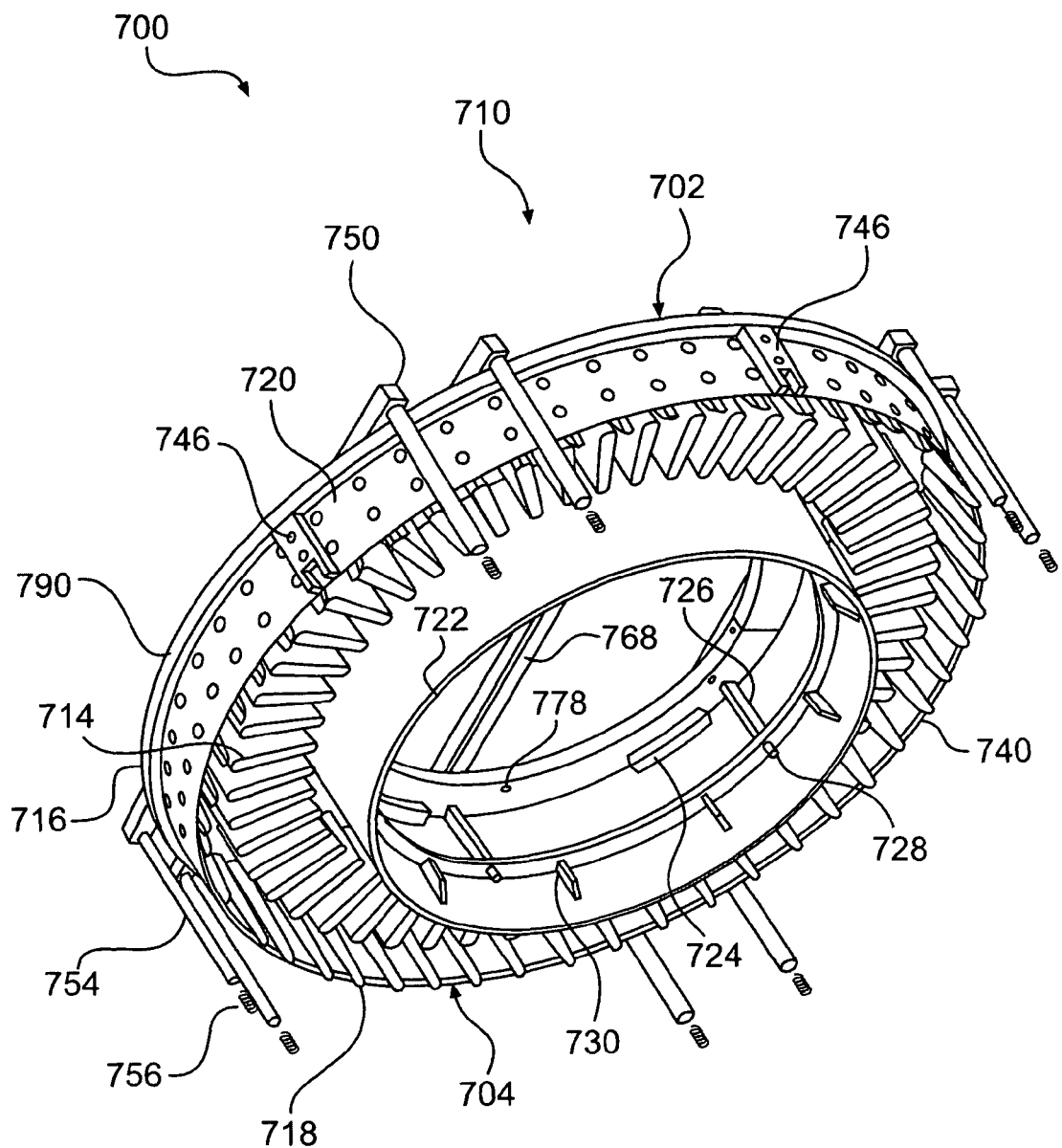
FIG. 7A is a perspective view of a top half of a mold in accordance with an embodiment of the present invention.
Figure 7B:
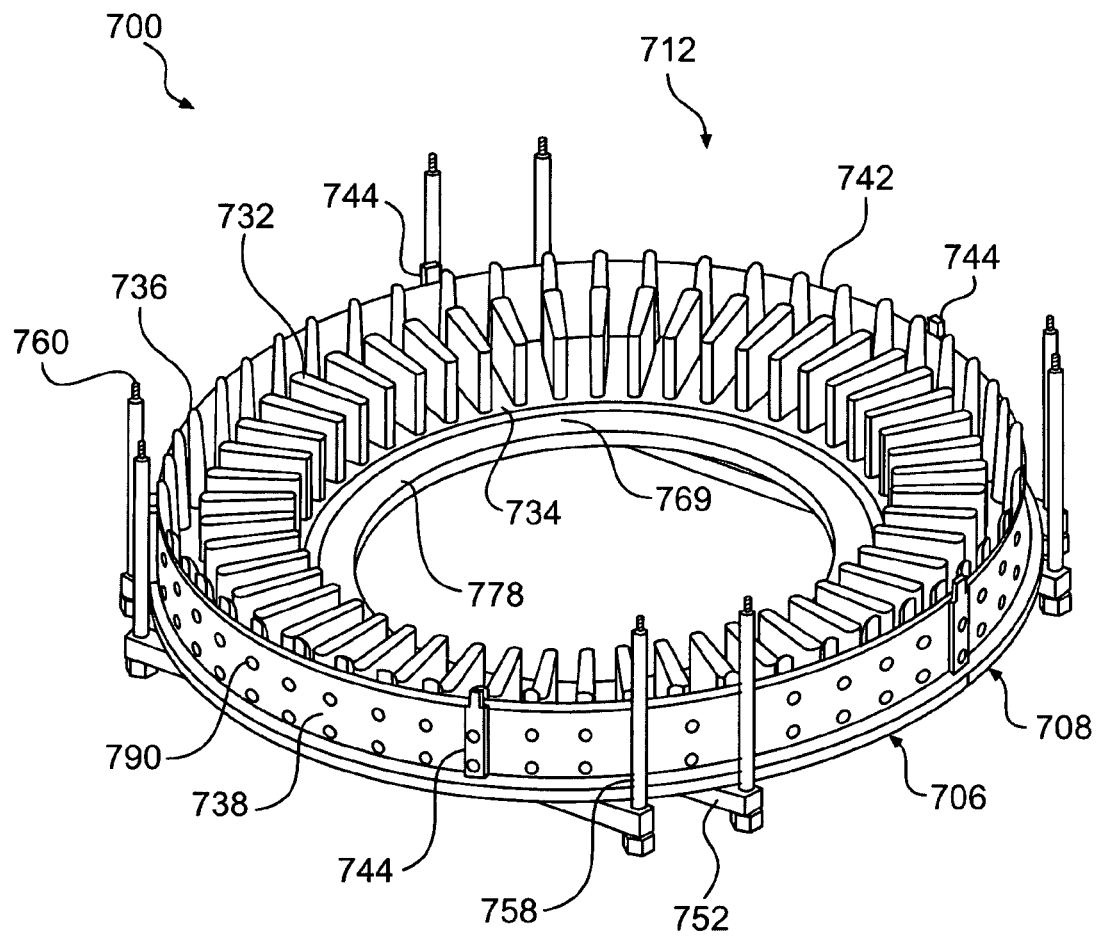
FIG. 7B is a perspective view of a bottom half of a mold in accordance with an embodiment of the present invention.

Mold 700 in FIGS. 7A-7D may be used to manufacture a tire having a outside diameter of 140.5 inches (356.9 cm). In FIGS. 7A-7D mold 700 comprises four plates 702, 704, 706, 708. Plates 702 and 704 are fastened together with bolts (not shown) to from a top half 710, while plates 706 and 708 are fastened together with bolts (not shown) to from a bottom half 712. One or more gaskets (not shown), such as O-rings, may be provided on the mechanical interface between plates 702 and 704 and plates 706 and 708. In other embodiments, plates 702 and 704 and plates 706 and 708 may be attached using other mechanical fasteners or welded together. As shown in FIG. 7A, half 710 comprises a plurality of inverse or negative cavity protrusions 714 extending from a base 716 that correspond to the cavities of tire, and a plurality of inverse or negative groove protrusions 718 extending from an outer retaining wall 720. Half 710 also comprises an inner retaining wall 722 that is mounted to half 710 by braces 724 and supports 726. A bonding band 728 having supports 730 is provided on the inner circumference of inner retaining wall 722. As shown in FIG. 7B, half 712 comprises a plurality of inverse or negative cavity protrusions 732 extending from a base 734 that correspond to the cavities of tire, and a plurality of inverse or negative groove protrusions 736 extending from an outer retaining wall 738.

When halves 710 and 712 are mated to form a closed mold 700 as shown in FIGS. 7C and 7D, the edge 740 of outer retaining wall 720 abuts the edge 742 of outer retaining wall 738. One or more gaskets (not shown), such as an O-ring, may be provided along edge 740, edge 742 or both. In addition, one or more male mating members 744 on outer retaining wall 738 align and engage with one or more corresponding female mating members 746 on outer retaining wall 720. The mating connection between members 744 and members 746 is an interconnecting fit that may be released.

Halves 710 and 712 are secured by one or more support beams 750 on half 710 which engages connection beams 752 on half 712. Support beams 750 comprise a tube 754 and spring 756. Connection beams 752 comprise a pin 758 have a threaded end 760 and a bolted end 762. Each pin 758 is inserted through the respective tube 754 such that springs 756 are compressed and threaded end 760 is exposed above support beam 750. A bolt 764 or similar fastening cap is secured to threaded end 760. Halves 710 and 712 may be clamped by bolt 764 and released by removing bolt 764. Half 710 also comprises a support brace 768 that does not have any tubes or pins.

When halves 710 and 712 are secured together using support beams 750 and connection beams 752, plates 702 and 704 are not symmetrically aligned with plates 706 and 708 as shown in FIG. 7C. This offset between plates allows the cavities formed in each sidewall of tire to be offset from each other to form a tire having a configuration shown in FIGS. 1A-1C. In other embodiments, plates may be aligned, but the protrusions may be offset.

Also, when halves 710 and 712 are secured together, the inner retaining wall 722 abuts a sub-base 769 of half 712. Inner retaining wall 722 is also pressed against base 734. In one embodiment, base 734 may curve slightly upward at the point where base 734 and inner retaining wall 722 adjoin. A slight curve may also exist where bases 716 and 734 each adjoins both of the outer retaining walls 720 and 736 and inner retaining wall 720.

Each plate 702, 704, 706 and 708 further comprises a plurality of holes. Fill holes 770 are provided to allow a material to be poured into mold 700. Vent holes 772 are provided to allow the material in mold 700 to be exposed to the air when curing. A sight hole 774 is provided to allow an operator to visually inspect the material in mold 700. Air holes 776 are provided for each spoke formed in tire. Lift holes 778 are provided so that halves 710 and 712 may be pulled parted using a press or similar machine. Bolts 780 attach outer retaining walls 720 and 738 to the respective halves 710 and 712. Lift holes 778 are also provided in sub-base 769 of half 712.

Cavity protrusions 714 and 734 are mounted to the respective bases 716 and 736 using bolts 788. Groove protrusions 718 and 732 are mounted to the respective outer retaining walls 720 and 736 using bolts 790. The removable protrusions may be reconfigured as necessary to mold tires having different configurations of cavities and grooves. In one embodiment cavity protrusions 714 and 734 are welded or otherwise adhered to the respective bases 716 and 736. In such embodiments, groove protrusions 718 and 732 may also be welded or otherwise adhered to the respective outer retaining walls 720 and 736. When welded, air holes 776 may still be provided above the cavity protrusions 714 and 734 as shown in FIG. 7C.

As shown in FIG. 7C, half 712 has five fill holes 770, six vent holes 772, and one sight hole 774. In one embodiment there may be from 1 to 20, e.g., from 2 to 10 or from 3 to 8, fill holes 770 on each half 710, 712. In one embodiment there may be from 0 to 20, e.g., from 2 to 10 or from 3 to 8, vent holes 772 on each half 710, 712. In one embodiment there may be from 0 to 10, e.g., from 1 to 5 or from 2 to 4, sight holes 774 on each half 710, 712. The number of air holes 776 may vary with the number of spokes created in tire. In one embodiment there may be from 4 to 40, e.g., from 8 to 20 or from 10 to 15, lift holes 778 on each half 710, 712.

In one embodiment, the inner retaining wall 722 may be welded or adhered directly to half 710. In such embodiments, braces 724 and supports 726 may provide additional lateral support for inner retaining wall 722.

Although not shown a heating system or heating jackets may surround all or a portion of the molds shown in FIG. 6 and FIGS. 7A-7D. Such heating systems may heat the material in the mold to cure and harden the material. In one embodiment, a heating system is fitted against the inner side of the inner retaining wall 720 and supported by brace 768.

Caytur 31™ and Caytur™ 31-DA are blocked delayed action amine curatives for use primarily with isocyanate terminated urethane prepolymers. Such curatives comprise of a complex of MDA and sodium chloride dispersed in a plasticizer (dioctyl phthalate in case of Caytur 31 and dioctyl adipate in case of Caytur 31-DA) and optionally a pigment. Caytur 31 has a very low free MDA content (typical <0.5%). At room temperature, such curatives are virtually non-reactive. However at 115° C.-160° C., the salt unblocks and the freed MDA reacts rapidly with the prepolymer to form a tough elastomer. Amine group concentration is 5.78% in Caytur 31 and Caytur 31-DA. Hence the equivalent weight is 244 for Caytur 31 and Caytur 31-DA. These groups are blocked by sodium chloride.

ADIPRENE™ LFM 2450 cured with Caytur™ 31DA, both made by Chemtura Corporation, is used to make a prophetic tire having a configuration similar to FIGS. 1A-1C.

Table 1 shows a computer simulated comparison of a tire of FIGS. 1A-1C constructed with staggered cavities and substantially overlapping grooves of Example 1 with a conventional pneumatic rubber tire and a comparative solid polyurethane tire. The comparative solid polyurethane tire has a similar dimensions of a pneumatic rubber tire without any cavities or grooves.

TABLE 1

| Tire | Tire Weight | Tire Deflection | Max Speed | Ground Pressure | Rim Outside Diameter |
|---|---|---|---|---|---|
| Pneumatic Rubber (Actual) | 8,000 lbs (3,629 kg) | 18.9% (7.8 in) (20 cm) | 30 mph (48 km/h) | 102 psi (703 kPa) | 57 in (145 cm) |
| Comparative Solid polyurethane (Calculated) | 22,600 lbs (10,250 kg) | 8.6% (3.6 in) (9.1 cm) | 2.0 mph (3.2 km/h) | 77 psi (531 kPa) | 57 in (145 cm) |
| Example 1 (FEA) | 7,100 (lbs) (3,220 kg) | 7.8% (1.8 in) (4.6 cm) | 30 mph (48 km/h) | 160 psi (1,103 kPa) | 94 in (239 cm) |

While this invention has been described with reference to illustrative embodiments and examples, the description is not intended to be construed in a limiting sense. Thus, various modifications of the illustrative embodiments, as well as other embodiments of the invention, will be apparent to persons skilled in the art upon reference to this description. It is therefore contemplated that the appended claims will cover any such modifications or embodiments.

All publications, patents and patent applications referred to herein are incorporated by reference in their entirety to the same extent as if each individual publication, patent or patent application was specifically and individually indicated to be incorporated by reference in its entirety.

Prophetic Example 1

Materials

Adriprene™ LFM 2450 is a MDI terminated PCL prepolymer mixture having low free MDI content (typically 3.0%-4.0%) due to a monomer removal step in manufacture. The NCO content of the prepolymer is about 4.35% to 4.55% and the equivalent weight is about 923 to 966. Adriprene™ LFM 2450 may be cured with Caytur™ curatives to yield a high performance 93-95 A elastomer, 59% rebound. Adriprene™ LFM 2450 is particularly suited for industrial non-pneumatic tires and wheels.

As shown in the results of TABLE 1, the tire of Example 1 has similar characteristics as a conventional pneumatic rubber tire, which is surprising in view of the characteristics of the comparative solid polyurethane tire. Example 1 is made of a polyurethane elastomer, similar to the comparative solid polyurethane tire, but is lighter than the comparative solid polyurethane tire due to the presence of cavities and grooves therein. Further, the comparative solid polyurethane tire is subject to interior melt down due to the inability to dissipate heat generated during the rotation of the solid polyurethane tire. It is believed that the improved performance of Example 1 is attributable to the configuration of cavities and grooves.

What is claimed is:
1. A non-pneumatic tire, comprising:
radially aligned side cavities on a first sidewall that are staggered with respect to radially aligned and laterally opposing side cavities on a second sidewall; and
tread grooves laterally extending from the first sidewall, wherein all tread grooves extending from the first sidewall are in substantial radial alignment with a respective cavity;
and
tread grooves laterally extending from the second sidewall, wherein all tread grooves extending from the second sidewall are in substantial radial alignment with the respective cavity and each being substantially offset from the respective opposing tread groove, wherein the tread grooves extend from the respective first sidewall or second sidewall, but not to the opposing sidewall;

wherein the ratio of all side cavities on said first sidewall to all tread grooves extending from said first sidewall is 1:1; and wherein the ratio of all side cavities on said second sidewall to all tread grooves extending from said second sidewall is 1:1; and wherein the tire has a unitary polyurethane structure and wherein the tire has a diameter of 60 inches to 159 inches.

2. The non-pneumatic tire of claim 1, wherein the side cavities and grooves are formed together in a mold.

3. The non-pneumatic tire of claim 1, wherein circumferentially adjacent cavities are separated from one another by ribs.

4. The non-pneumatic tire of claim 3, wherein the ribs are radially oriented.

5. The non-pneumatic tire of claim 3, wherein the ribs are staggered with respect to laterally opposing ribs.

6. The non-pneumatic tire of claim 1, further comprising: a central web oriented in an equatorial plane of the tire.

7. The non-pneumatic tire of claim 6, wherein the tread grooves extend across the equatorial plane of the tire.

8. A vehicle comprising one or more of the non-pneumatic tires of claim 1.

9. The non-pneumatic tire of claim 1, wherein the tire comprises no first or second tread grooves that are substantially offset from the respective cavity.

10. A non-pneumatic tire, comprising:
radially aligned side ribs on a first sidewall that are staggered with respect to radially aligned and laterally opposing side ribs on a second sidewall; and
tread grooves laterally extending from the first sidewall, wherein all tread grooves extending from the first sidewall are substantially radially offset relative to the respective side rib and
tread grooves laterally extending from the second sidewall, wherein all tread grooves extending from the second sidewall are substantially radially offset relative to the respective side rib and each being substantially offset from the respective opposing tread groove,
wherein the tread grooves extend from the respective first sidewall or second sidewall, but not to the opposing sidewall; and
wherein the ratio of all side ribs on said first sidewall to all tread grooves extending from said first sidewall is 1:1; and the ratio of all side ribs on said second sidewall to all tread grooves extending from said second sidewall is 1:1;
and
wherein the tire has a unitary polyurethane structure and wherein the tire has a diameter of 60 inches to 159 inches.

11. The non-pneumatic tire of claim 10, wherein the side ribs and grooves are formed together in a mold.

12. The non-pneumatic tire of claim 10, wherein each pair of circumferentially adjacent side ribs are separated from one another by a cavity.

13. The non-pneumatic tire of claim 12, wherein the cavities are staggered with respect to laterally opposing cavities.

14. The non-pneumatic tire of claim 10, further comprising:
a central web oriented in an equatorial plane of the tire.

15. The non-pneumatic tire of claim 14, wherein the tread grooves extend across the equatorial plane of the tire.

16. A vehicle comprising one or more of the non-pneumatic tires of claim 10.

17. The non-pneumatic tire of claim 10, wherein the tire comprises no tread grooves that are substantially aligned with the respective rib.

18. A non-pneumatic tire, comprising:
inner and outer circumferential members;
a central web connecting the circumferential members;
first and second sidewalls opposing one another;
radially aligned ribs extending from the opposing sidewalls to the central web and defining radially aligned side cavities, wherein ribs on one side of the central web are staggered relative to ribs on an opposite side of the central web; and
tread grooves embedded in an outer surface of the outer circumferential member and laterally extending inwardly from the first sidewall but not to the opposing sidewall, wherein each tread groove is substantially offset relative to the respective rib, and tread grooves embedded in the outer surface of the outer circumferential member and laterally extending inwardly from the second sidewall but not to the opposing sidewall, wherein each tread groove is substantially offset relative to the respective rib and each tread groove is substantially offset from the respective opposing tread groove,
wherein the ratio of all side ribs on said first sidewall to all tread grooves extending from said first sidewall is 1:1; and the ratio of all side ribs on said second sidewall to all tread grooves extending from said second sidewall is 1:1;
and
wherein the tire has a unitary polyurethane structure and wherein the tire has a diameter of 60 inches to 159 inches.

19. The non-pneumatic tire of claim 18, wherein the ribs, side cavities, and grooves are formed together in a mold.

20. A vehicle comprising one or more of the non-pneumatic tires of claim 18.

21. The non-pneumatic tire of claim 18, wherein the tire comprises no tread grooves that are substantially aligned with the respective rib.

* * * * *